United States Patent
Ravi et al.

(10) Patent No.: US 11,423,233 B2
(45) Date of Patent: *Aug. 23, 2022

(54) ON-DEVICE PROJECTION NEURAL NETWORKS FOR NATURAL LANGUAGE UNDERSTANDING

(71) Applicant: Google LLC, Mountain View, CA (US)

(72) Inventors: Sujith Ravi, Santa Clara, CA (US); Zornitsa Kozareva, Santa Clara, CA (US)

(73) Assignee: GOOGLE LLC, Mountain View, CA (US)

( * ) Notice: Subject to any disclaimer, the term of this patent is extended or adjusted under 35 U.S.C. 154(b) by 41 days.

This patent is subject to a terminal disclaimer.

(21) Appl. No.: 17/141,473

(22) Filed: Jan. 5, 2021

(65) Prior Publication Data

US 2021/0124878 A1 Apr. 29, 2021

Related U.S. Application Data

(63) Continuation of application No. 16/135,545, filed on Sep. 19, 2018, now Pat. No. 10,885,277.

(Continued)

(51) Int. Cl.
*G06F 40/30* (2020.01)
*G06N 3/08* (2006.01)
(Continued)

(52) U.S. Cl.
CPC ............ *G06F 40/30* (2020.01); *G06F 40/253* (2020.01); *G06N 3/04* (2013.01); *G06N 3/084* (2013.01)

(58) Field of Classification Search
CPC ......... G06F 40/30; G06F 40/253; G06N 3/04; G06N 3/084
(Continued)

(56) References Cited

U.S. PATENT DOCUMENTS 5,276,771 A * 1/1994 Manukian ............ G06N 3/0454
706/31
9,842,106 B2 12/2017 Hori et al.
(Continued)

FOREIGN PATENT DOCUMENTS

| CN | 104538028 | 4/2015 |
| EP | 3144859 | 3/2017 |
| WO | WO 1993/13487 | 7/1993 |

OTHER PUBLICATIONS

G. Zhong, H. Xu, P. Yang, S. Wang and J. Dong, "Deep hashing learning networks," 2016 International Joint Conference on Neural Networks (IJCNN), Vancouver, BC, 2016, pp. 2236-2243, doi: 10.1109/IJCNN.2016.7727476. (Year: 2016).*

(Continued)

*Primary Examiner* — Bharatkumar S Shah

(74) *Attorney, Agent, or Firm* — Dority & Manning, P.A.

(57) ABSTRACT

The present disclosure provides projection neural networks and example applications thereof. In particular, the present disclosure provides a number of different architectures for projection neural networks, including two example architectures which can be referred to as: Self-Governing Neural Networks (SGNNs) and Projection Sequence Networks (ProSeqoNets). Each projection neural network can include one or more projection layers that project an input into a different space. For example, each projection layer can use a set of projection functions to project the input into a bit-space, thereby greatly reducing the dimensionality of the input and enabling computation with lower resource usage. As such, the projection neural networks provided herein are highly useful for on-device inference in resource-constrained devices. For example, the provided SGNN and ProSeqoNet architectures are particularly beneficial for on- (Continued)

device inference such as, for example, solving natural language understanding tasks on-device.

20 Claims, 9 Drawing Sheets

Related U.S. Application Data

(60) Provisional application No. 62/714,028, filed on Aug. 2, 2018.

(51) Int. Cl.
G06N 3/04 (2006.01)
G06F 40/253 (2020.01)

(58) Field of Classification Search
USPC .......................................................... 704/9
See application file for complete search history.

(56) References Cited

U.S. PATENT DOCUMENTS

| | | | |
|---|---|---|---|
| 9,990,687 B1 | 6/2018 | Kaufhold et al. | |
| 2014/0067735 A1 | 3/2014 | Yu et al. | |
| 2014/0156575 A1 | 6/2014 | Sainath et al. | |
| 2015/0074027 A1 | 3/2015 | Huang et al. | |
| 2016/0078339 A1 | 3/2016 | Li et al. | |
| 2016/0307564 A1 | 10/2016 | Sethy et al. | |
| 2016/0307566 A1 | 10/2016 | Bellegarda | |
| 2017/0132528 A1 | 5/2017 | Aslan et al. | |
| 2017/0139913 A1* | 5/2017 | Hsiao | G06F 16/182 |
| 2018/0121799 A1* | 5/2018 | Hashimoto | G06N 3/0454 |
| 2018/0150744 A1 | 5/2018 | Orr et al. | |
| 2018/0356771 A1 | 12/2018 | Basu et al. | |

OTHER PUBLICATIONS

X. Lu, ɎY. Chen and X. Li, "Hierarchical Recurrent Neural Hashing for Image Retrieval With Hierarchical Convolutional Features," in IEEE Transactions on Image Processing, vol. 27, No. 1, pp. 106-120, Jan. 2018, doi: 10.1109/TIP.2017.2755766 (Year: 2018) (Year: 2018) (Year: 2018).*
Abadi et al, "TensorFlow: Large-Scale Machine Learning on Heterogeneous Systems", arXiv:1603v2, Mar. 16, 2016, 19 pages.
Adam et al, "The ICSI Meeting Corpus", Acoustics, Speech, and Signal Processing, May 2003, 4 pages.
Ahmed et al, "FastEx: Hash Clustering with Exponential Families", Advances in Neural Information Processing System, 9 pages.
Bandanau et al, "Neural Machine Translation by Jointly Learning to Align and Translate", arXiv:1409v7, May 19, 2016, 15 pages.
Bui et al, "Neural Graph Machines: Learning Neural Networks using Graphs", arXiv:1703v1, Mar. 14, 2017, 9 pages.
Bui et al, "Neural Graph Learning: Training Neural Networks Using Graphs", Conference on Web Search and Data Mining, 8 pages.
Byrne, "Encoding Reality: Prediction-Assisted Cortical Learning Algorithm in Hierarchical Temporal Memory", arXiv:1509v2, Oct. 8, 2015, 28 pages.
Charikar, "Similarity Estimation Techniques from Round Algorithms", Symposium on Theory of Computing, May 2002, 9 pages.
Chen et al,"Compressing Neural Networks with the Hashing Trick", arXiv:1504v1, Apr. 19, 2015, 10 pages.
Cheng et al, "Solving Convex Optimization Problems using Recurrent Neural Networks in Finite Time", International Joint Conference on Neural Networks, Atlanta, Georgia, 2009, pp. 538-543.
Chun et al, "Augmented Smartphone Applications through Clone Cloud Execution", Internal Research Berkeley, 5 pages.
Communication received in European Application No. 18729286.7, dated Feb. 4, 2020, 13 pages.
Courbariaux et al, "Binarized Neural Networks: Training Neural Networks with Weights and Activations Constrained to +1 or −1", arXiv:1602v3, Mar. 17, 2016, 11 pages.
Courbariaux et al, "Low Precision Arithmetic for Deep Learning", arXiv:1412v2, Dec. 25, 2014, 9 pages.
Dahl et al, "Large-Scale Malware Classification using Random Projection Networks", Conference on Acoustics, Speech and Signal Processing, 2013, 5 pages.
Denil et al, "Predicting Parameters in Deep Learning", arXrv:1306v2, Oct. 27, 2014, 9 pages.
Ganchev et al, "Small Statistical Models by Random Feature Mixing", Workshop on Mobile Language Processing, pp. 19-20.
Godfrey et al., "Switchboard: Telephone Speech Corpus for Research And Development", Conference of the International Speech Communication Association, Mar. 23-26, 1992, San Francisco, California, pp. 517-520.
Gong et al, "Compressing Deep Convolutional Networks using Vector Quantization"; arXiv:1412v1, Dec. 18, 2014, 10 pages.
Goodfellow et al, "Generative Adversarial Networks", arXrv:1406v1, Jun. 10, 2014, 9 pages.
Hinton et al, "Deep Neural Networks for Acoustic Modeling in Speech Recognition: The Shared Views of Four Research Groups", Signal Processing Magazine, vol. 2, Nov. 2012, 16 pages.
Hinton et al, "Distilling the Knowledge in a Neural Network", arXiv:1503v1, Mar. 9, 2015, 9 pages.
Iandola et al, "Squeezenet: Alexnet-Level Accuracy with 50x Fewer Parameters and <1mb model size", arXiv:1602v4, Nov. 4, 2016, 13 pages.
International Preliminary Report on Patentability for PCT/US2018/033378, dated Nov. 26, 2019, 13 pages.
International Search Report and Written Opinion for PCT/US2018/033378, dated Jul. 24, 2018, 20 pages.
Ji et al, "Backoff Model Training Using Partially Observed Data: Application to Dialog Act Tagging", Human Language Technology Conference of the North American Chapter of the Association of Computational Linguistics, 8 pages.
Jurafsky et al, "Automatic Detection of Discourse Structure for Speech Recognition and Understanding", Automatic Detection of Discourse Structure for Speech Recognition and Understanding, 8 pages.
Kaban, "Improved Bounds on the Dot Product Under Random Projection and Random Sign Projection", Conference on Knowledge Discovery and Data Mining, 2015, 10 pages.
Kannan et al, "Smart Reply: Automated Response Suggestion for Emails", arXiv:1606v1, Jun. 15, 2016, 10 pages.
Khanpour et al, "Dialogue Act Classification in Domain-Independent Conversations Using a Deep Recurrent Neural Networks", Conference on Computational Linguistics, Dec. 11-17, 2016, Osaka, Japan, 10 pages.
Konecny et al, "Federated Optimization: Distributed Machine Learning for On-Device Intelligence", arXiv:1601v1, Oct. 8, 2016, 38 pages.
Krizhevsky et al, "Imagenet Classification with Deep Convolutional Neural Networks", Advances in Neural Information Processing Systems, Dec. 2012, 9 pages.
Krizhevsky, "The CIFAR-10 Dataset", 4 pages.
LeCun et al, "The MNIST Database", 7 pages.
Lee et al, "A Low-Power Processor with Configurable Embedded Machine-Learning Accelerators for High-Order and Adaptive Analysis of Medical-Sensor Signals", Journal of Solid-State Circuits, vol. 48, No. 7, Jul. 2013, pp. 1625-1637.
Lee et al, "Sequential Short-Text Classification with Recurrent and Convolutional Neural Networks", Conference of the North American Chapter of the Association for Computational Linguistics: Human Language Technologies, San Diego, California, Jun. 12-17, 2016, pp. 515-520.
Liu et al, "IJCNLP-2017 Task 4: Customer Feedback Analysis", Joint Conference on Natural Language Processing, Taipei, Taiwan, Nov. 27-Dec. 1, 2017, 8 pages.
Loshchilov et al, "SGDR: Stochastic Gradient Descent with Restarts", 16 pages.
Lu et al, "Hierarchical Recurrent Neural Hashing for Image Retrieval with Hierarchical Convolutional Features", Transactions on Image Processing, vol. 27, No. 1, pp. 106-120.
Manning et al, "An Introduction to Information Retrieval", Online Edition 2009 Cambridge University Press, 569 pages.

(56) References Cited

OTHER PUBLICATIONS

Mikolov et al, "Efficient Estimation of Word Representations in Vector Space", arXiv:1301v3, Sep. 7, 2013, 12 pages.
Nair et al, "Rectified Linear Units Improve Restricted Boltzmann Machines", Conference on Machine Learning, Jun. 2010, 8 pages.
Neumann, "Regularization by Intrinsic Plasticity and Its Synergies with Recurrent for Random Projection Methods", Journal of Intelligent Learning Systems and Applications, 2012, pp. 230-246.
Ortega et al, "Neural-Based Context Representation Learning for Dialog Act Classification", SIGdial Meeting on Discourse and Dialogue, pp. 247-252.
Pang et al, "Revisiting the Predictability of Language: Response Completion in Social Media", Joint Conference on Empirical Methods in Natural Language Processing and Computational Natural Language Learning, Jeju Island, Korea, Jul. 12-14, 2012, pp. 1489-1499.
Plank, "All-in-1 at IJCNLP-2017 Task 4: Short Text classification with One Model for All Languages", Joint Conference on Natural Language Processing, Shared Tasks, Taipei, Taiwan, Nov. 27-Dec. 1, 2017, pp. 143-148.
Quora, "What Does Dr. Hinton Mean by Hard vs. Soft Targets", retrieved on Jun. 24, 2020, http://quora.com/what-does-Dr-Hinton-mean-by-hard-vs-soft-targets, 2 pages.
Quora, "What is Signum Function, What is its Uses in Machine Learning Neural Networks", retrieved on Jun. 24, 2020, http://www.quora.com/What-is-signum-function-what-is-its-uses-in-machine-learning-neural-networks, 3 pages.
Ravi et al, "Large Scale Distributed Semi-Supervised Learning using Streaming Approximation", arXiv:1512v1, Dec. 6, 2015, 10 pages.
Ravi, "ProjectionNet: Learning Efficient On-Device Deep Networks Using Neural Projections", arXiv:1708v2, Aug. 9, 2017, 12 pages.
Ravi, "Scalable Decipherment for Machine Translation via Hash Sampling", Meeting of the Association for Computational Linguistics, Sofia, Bulgaria, Aug. 4-9, 2013, pp. 362-371.
Schuster, "Speech Recognition for Mobile Devices at Google", Pacific Rim initernational Conference on Trends in Artificial Intelligence, Aug. 30, 2010, 3 pages.
Search Report and Written Opinion in Singapore Application No. 10201804213U, dated Dec. 31, 2019, 8 pages.
Search Report in Irish Application No. 2018/0149, dated Jul. 31, 2018, 10 pages.
Shi et al, "Hash Kernels for Structured Data", Journal of Machine Learning Research, vol. 10, 2009, pp. 2615-2637.
Shriberg et al, "The ICSI Meeting Recorder Dialog Act (MRDA) Corpus", SIGdial Workshop on Discourse and Dialogue, Campbridge, Massachusetts, 4 pages.
Singleton, "Android Wear 2.0: Making the Most of Eveiy Minute", 6 pages.
Srivastava et al, "Dropout: A Simple Way to Prevent Neural Networks from Overfitting", Journal of Machine Learning Research, vol. 15, 2014, 30 pages.
Stolcke, "Entropy-Based Pruning of Backoff Language Models", arXiv:cs/0006025v1, Jun. 11, 2000, 5 pages.
Stolcke et al, "Dialogue Act Modeling for Automatic Tagging and Recognition of Conversational Speech", Speech, Technology and Research Laboratory, 36 pages.
Sutskever et al, "On the Importance of Initialization and Momentum in Deep Learning".
Sutskever et al, "Sequence to Sequence Learning with Neural Networks", Advances in Neural Information Processing System, Dec. 2014, 9 pages.
Theiler et al, "Sparse Matrix Transform for Fast Projection to Reduce Dimension", Geoscience and Remote Sensing, Honolulu, Hawaii, Jul. 30, 2010, 5 pages.
Tran et al, "A Generative Attentional Neural Network Model for Dialogue Act Classification", Meeting of the Association for Computational Linguistics, 6 pages.
Wang et al, "Learning to Hash for Indexing Big Data—A Survey", arXiv:1509v1, Sep. 17, 2015, 22 pages.
Weinberger et al, "Feature Hashing for Large Scale Multitask Learning", arXiv:0902v5, Feb. 7, 2010, 10 pages.
Wilensky et al, "The Projection Neural Network", 10 pages.
Wojcik et al, "Training Neural Networks on High-Dimensional Data Using Random Projection", Pattern Analysis and Applications, 11 pages.
Yang et al, "Revisiting Semi-Supervised Learning with Graph Embeddings", arXiv:1603v2, May 26, 2016, 9 pages.
Zhong et al, "Deep Hashing Learning Networks", Joint Conference on Neural Networks, Vancouver, British Columbia, 2016, pp. 2236-2243.
Zhu et al, "A Deep Neural Network Based Hashing for Efficient Image Retrieval", Conference on Systems, Man, and Cybernetics, Oct. 9-12, 2016, Budapest, Hungary, 6 pages.

\* cited by examiner

ON-DEVICE PROJECTION NEURAL NETWORKS FOR NATURAL LANGUAGE UNDERSTANDING

RELATED APPLICATIONS

The present disclosure is a continuation of U.S. patent application Ser. No. 16/135,545 filed Sep. 19, 2018, which claims priority to and the benefit of U.S. Provisional Patent Application No. 62/714,028 filed Aug. 2, 2018 and titled On-Device Projection Neural Networks for Natural Language Understanding. Each of U.S. patent application Ser. No. 16/135,545 and U.S. Provisional Patent Application No. 62/714,028 is hereby incorporated by reference in its entirety.

FIELD

The present disclosure relates generally to artificial neural networks. More particularly, the present disclosure relates to novel projection neural network architectures such as, for example, Self-Governing Neural Networks and Projection Sequence Networks.

BACKGROUND

Neural networks are machine-learned models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks are recurrent neural networks. A recurrent neural network is a neural network that receives an input sequence and generates an output sequence from the input sequence. In particular, a recurrent neural network can use some or all of the internal state of the network from a previous time step in computing an output at a current time step. An example of a recurrent neural network is a long short term (LSTM) neural network that includes one or more LSTM memory blocks. Each LSTM memory block can include one or more cells that each include an input gate, a forget gate, and an output gate that allow the cell to store previous states for the cell, e.g., for use in generating a current activation or to be provided to other components of the LSTM neural network.

Deep neural networks are one of the most successful machine learning methods, outperforming many state-of-the-art machine learning methods in natural language processing, speech, and visual recognition tasks. The availability of high performance computing has enabled research in deep learning to focus largely on the development of deeper and more complex network architectures for improved accuracy. However, the increased complexity of the deep neural networks has become one of the biggest obstacles to deployment of deep neural networks on-device in certain devices such as mobile phones, smart watches, and/or other resource-constrained devices such as Internet of Things devices.

Thus, in some scenarios, the main challenges associated with developing and deploying deep neural network models on-device include: a relatively small memory footprint; inference latency; and significantly lower computational capacity compared to high performance computing systems such as CPUs, GPUs, and TPUs available via cloud computing systems.

One example application of neural networks is text classification. There are multiple strategies to build lightweight text classification models for on-device. For example, a small dictionary of common input→category mapping can be stored on the device and a naive look-up can be performed at inference time. However, such an approach does not scale to complex natural language tasks involving rich vocabularies and wide language variability.

Another possible strategy is to incorporate deep learning models with graph learning, which have proven to be extremely powerful for complex language understanding tasks like predicting appropriate responses to textual messages. However, as described above, developing and deploying deep neural network models on-device raises a number of challenges. Thus, solutions other than large, complex models may be desired in certain circumstances.

SUMMARY

Aspects and advantages of embodiments of the present disclosure will be set forth in part in the following description, or can be learned from the description, or can be learned through practice of the embodiments.

One example aspect of the present disclosure is directed to a system that includes one or more computers and one or more storage devices storing instructions that when executed by the one or more computers cause the one or more computers to implement a projection neural network configured to receive a projection network input and to generate a projection network output from the projection network input. The projection neural network includes a sequence of one or more projection layers. Each projection layer has a plurality of projection layer parameters. Each projection layer is configured to: receive a layer input; apply a plurality of projection layer functions to the layer input, each projection layer function generating a respective projection function output that projects the layer input to a different space, and generate a layer output by applying the projection layer parameters for the projection layer to the projection function outputs. The projection neural network includes a sequence of one or more additional hidden layers positioned structurally after the sequence of one or more projection layers. The sequence of one or more additional hidden layers is configured to receive a layer output generated by a highest projection layer in the sequence of one or more projection layers and to generate one or more additional hidden layer outputs. Execution of the instructions causes the one or more computers to perform operations comprising: obtaining the projection network input; inputting the projection network input into the projection neural network; and receiving the projection network output generated by the projection neural network.

Another example aspect of the present disclosure is directed to a system that includes one or more computers and one or more storage devices storing instructions that when executed by the one or more computers cause the one or more computers to implement a projection sequence network configured to receive an input and to generate an output from the input. The projection sequence network includes a sequence of one or more projection layers. Each projection layer has a plurality of projection layer parameters, Each projection layer is configured to: receive a layer input; apply a plurality of projection layer functions to the layer input, each projection layer function generating a respective projection function output that projects the layer input to a different space, and generate a layer output by applying the projection layer parameters for the projection layer to the projection function outputs. The projection sequence network includes one or more projection sequence layers positioned structurally after the sequence of one or more projection layers. Each of the one or more projection sequence layers is configured to provide first internal state data to a subsequent iteration of such projection sequence layer in a subsequent iteration of the projection sequence network and to receive second internal state data from the subsequent iteration of such projection sequence layer in the subsequent iteration of the projection sequence network. Execution of the instructions causes the one or more computers to perform operations comprising: obtaining the input; inputting the input into the projection sequence network; and receiving the output generated by the projection sequence network.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
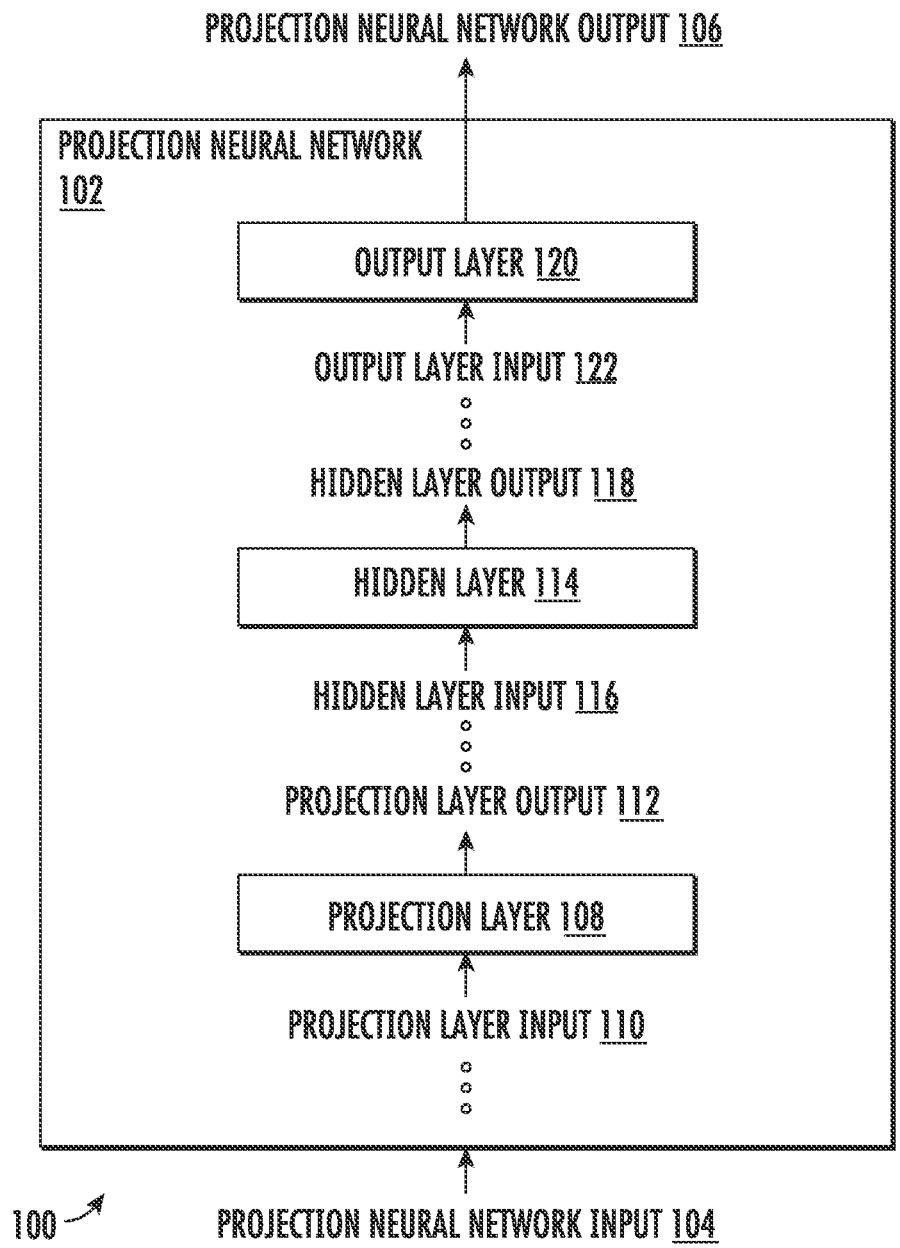
FIG. 1 shows an example projection neural network system according to example embodiments of the present disclosure.

Generally, the present disclosure is directed to projection neural networks and example applications thereof. In particular, the present disclosure provides a number of different architectures for projection neural networks, including two example architectures which can be referred to as: Self-Governing Neural Networks (SGNNs) and Projection Sequence Networks (ProSeqoNets). Each projection neural network can include one or more projection layers that project an input into a different space. For example, each projection layer can use a set of projection functions to project the input into a bit-space, thereby greatly reducing the dimensionality of the input and enabling computation with lower resource usage. As such, the projection neural networks provided herein are highly useful for on-device inference in resource-constrained devices. For example, the provided SGNN and ProSeqoNet architectures are particularly beneficial for on-device inference such as, for example, solving natural language understanding tasks on-device. In addition, both of these network architectures can handle multilingual texts and can solve a wide range of text classification and sequence labeling tasks.

More particularly, neural networks are a class of non-linear models that learn a mapping from inputs $\vec{x}_i$ to outputs $y_i$, where $\vec{x}_i$ represents an input feature vector or sequence (e.g., in the case of recursive neural networks) and $y_i$ is an output (e.g., an output category for classification tasks or a predicted sequence). Typically, these networks consist of multiple layers of hidden units or neurons with connections between a pair of layers. For example, in a fully-connected feed-forward neural network, the number of weighted connections or network parameters that are trained is $O(n^2)$, where n is the number of hidden units per layer.

Aspects of the present disclosure are directed to neural networks that include one or more projection layers and which, therefore, can be referred to as projection neural networks. A projection layer can reduce the dimensionality of a projection layer input by processing the input using projection layer functions. In particular, in some implementations, a projection layer can leverage random projections to transform inputs or intermediate representations into bits. Thus, projection networks can encode lightweight and efficient-to-compute operations in bit space with a low memory footprint.

More particularly, in some implementations, a projection layer can define a set of efficient projection functions $\mathbb{P}(\cdot)$ that project an input (e.g., an input instance $\vec{x}_i$ or some other intermediate representation received as a layer input) to a different space $\Omega_\mathbb{P}$. The projection $\Omega_\mathbb{P}$ layer can then perform learning in this space to map the projected information to corresponding layer outputs. In some implementations, the set of projection functions for a projection layer can include a series of T projection functions $\mathbb{P}^1, \ldots, \mathbb{P}^T$, which can then be followed by a layer of activations or other form of layer parameters that map from the projection space to a layer output.

In some implementations, the projection transformations can take the form of pre-computed parameterized functions. Thus, in some implementations, they are not trained during the learning process. The outputs of the projection functions can be concatenated to form the hidden units for subsequent operations. For example, in some implementations, during training, the projection network can learn, within each projection layer, to choose and apply specific projection operations $\mathbb{P}_j$ (e.g., via activations) that are more predictive for a given task.

Thus, a projection layer reduces the dimensionality of a projection layer input by processing the projection layer input by projection layer functions. The projection layer functions generate projection function outputs that have a dimensionality that may be several orders of magnitude smaller than the dimensionality of the projection layer input. The projection layer can then generate a projection layer output by applying projection layer parameters (e.g., a weight matrix and a bias vector) to the low-dimensional projection function outputs.

In contrast, a conventional neural network layer (e.g., a conventional fully-connected layer) may directly process a (high-dimensional) conventional layer input without first reducing the dimensionality of the conventional layer input. Since projection layers reduce the dimensionality of layer inputs by projection functions, projection layers may require far fewer layer parameters and may perform far fewer arithmetic operations in generating layer outputs than some conventional neural network layers.

Therefore, projection layers can reduce computational resource consumption (e.g., relative to conventional neural network layers) by performing fewer arithmetic operations and therefore consuming less computing power. Moreover, projection layers can reduce computational resource consumption since they can be stored (e.g., in a logical data storage area or physical data storage device) using less memory (e.g., as measured in bytes).

Consequently, projection networks may be suitable for deployment in resource-constrained systems, such as mobile device environments (e.g., smartphones and smartwatches), where some conventional neural networks are less easily deployed (e.g., because their computational resource demands exceed the computational resources available). Moreover, deploying projection networks to resource constrained systems enables these systems to increase data privacy by performing tasks locally instead of remotely. Performing a task locally refers to performing the task using computational resources located within the system, whereas performing a task remotely refers to transmitting data characterizing the task to a remote environment (e.g., a cloud environment) over a communications network (e.g., the Internet), and receiving the results of the completed task back over the communications network. Performing tasks locally can increase data privacy since it does not require transmitting data over communications networks.

According to an aspect of the present disclosure, some projection neural network architectures can include a stack of one or more additional layers connected to a sequence of one or more projection layers. In particular, in some examples, a projection neural network can include a sequence of one or more projection layers, a sequence of one or more hidden layers positioned structurally after the one or more projection layers, and an output layer positioned structurally after the sequence of one or more hidden layers. The one or more hidden layers can include different types of layers including fully connected layers (e.g., featuring non-linear activations), convolutional layers, recurrent layers, additional projection layers, projection sequence layers (described in further detail below), and/or other forms of additional layers.

As one example of this principle, the projection neural networks described herein can include Self-Governing Neural Networks (SGNNs), which can include one or more projection layers followed, for example, by one or more fully connected hidden layers. In some implementations, SGNNs can be on-device deep learning models learned via embedding-free projection operations.

In particular, in some implementations, the SGNNs can learn compact projection vectors with locality sensitive hashing (LSH). For example, a modified version of LSH can be employed to reduce an input dimension (e.g., from millions of unique words/features to a short, fixed-length sequence of bits). This enables computation of a projection for an input (e.g., an incoming text) very fast, on-the-fly, and with a small memory footprint on the device. For example, for text inputs, computation of the projection can be performed very quickly as the incoming text and word embeddings are not required to be stored.

As one example use, the SGNNs can be used to perform on-device text classification. For text classification, a SGNN can take as input the text and can consider the whole context to produce a single class or multiple classes. Thus, in some implementations, the input to an SGNN can include a single input vector that has been generated on the basis of a text string and additional features derived from or otherwise associated with the text string. Such multiple types of information can be concatenated to form the single input vector. The SGNN can process the single input vector to produce a classification output that classifies the text string as a whole.

One advantage provided by SGNNs over existing work is that they surmount the need for pre-trained word embeddings and complex networks with huge parameters. In sections that follow, the present disclosure provides the results of extensive evaluation on dialog act classification which show significant improvement over state-of-the-art results. The results show that SGNNs are effective at capturing low-dimensional semantic text representations, while maintaining high accuracy. The performance of SGNNs was analyzed on Dialogue Act classification because it is an important step towards dialog interpretation and conversational analysis aiming to understand the intent of the speaker at every utterance of the conversation and also because deep learning methods reached state-of-the-art.

According to another aspect of the present disclosure, the projection neural networks described herein include Projection Sequence Networks (ProSeqoNets), which can include one or more projection layers followed by, for example, one or more projection sequence layers. Each projection sequence layer can pass information forward and/or backward to subsequent and/or previous iterations of such layer as a sequential input is input into the network over a series of time steps. For example, each projection sequence layer can include a first set of nodes that pass information forward to subsequent iterations and/or receive information from previous iterations and also a second set of nodes that receive information passed back from subsequent iterations and/or pass information backward to previous iterations.

In some implementations, one or more (e.g., all) of the nodes included in the first set of nodes and/or the second set of nodes can be or include recurrent cells that have been modified for inclusion in the projection sequence layer. Example recurrent cells include LSTM cells and gated recurrent units (GRUs). In particular, in the modified recurrent cells, the projection state can be used to modify the internal state or dependencies of the cell rather than the base input features.

ProSeqoNets can be used, for example, to perform on-device sequence labeling. In particular, for text sequence labeling, a ProSeqoNet can take as input the text, and can identify segments (e.g., sequences of words/phrases) and classify the segments into categories. ProSeqoNets can also be used for various other natural language processing tasks, particularly those which are serial or sequential in nature. As one example, ProSeqoNets can also be used for generating new output that goes beyond characterizing (e.g., segmenting and/or classifying) the input. As examples, ProSeqoNets can be used for translating an input text into a different language (e.g., generating an output that is a translated version of the input text) and/or completing an input text string (e.g., generating an output that adds to or otherwise completes the input text).

Thus, in some implementations, the input to ProSeqoNets can be sequential in nature and the ProSeqoNets can operate iteratively (e.g., at each of a plurality of time steps) to process the sequential input. As one example, for input that is or includes a text string, one character, syllable, word, n-gram, chunk, or other portion of the text string can be input at each of a plurality of iterations. At each iteration, information from past time steps (e.g., the raw text and/or intermediate feature data) may or may not also be provided alongside the newly provided portion.

In addition, in some implementations, additional features can be provided as initial or intermediate input to the ProSeqoNets in addition to the base input (e.g., in addition to the raw text). In some implementations, these additional features can be included in one or more additional feature vectors. Thus, in some implementations, the input to the ProSeqoNet can include multiple feature vectors which may have different dimensional spaces associated therewith. These feature vectors may or may not include type information that describes the type of features.

In implementations in which the input to ProSeqoNets includes multiple feature vectors, input of such vectors into the network can be handled in a number of different ways. As one example, the multiple feature vectors can be concatenated and flattened to form a single input vector. In other implementations, at each iteration, each feature vector can be separately input into the network and separately projected by the projection layer(s). After separate projection, the outputs of the projection layer(s) can be concatenated in the projected space (e.g., the bit space). In some implementations, some projection functions and/or bit space positions can be reserved and used for encoding the type information respectively associated with the feature vectors, such that the networks can learn, in the projected space, to choose or ignore various information based on its feature type as it relates to the input or other feature types.

However, ProSeqoNets are not limited to use in for sequence-based tasks. For example, similar to SGNNs ProSeqoNets can also be used for text classification such as, for example, classifying an entire input text into one or multiple classes.

Neither the SGNNs nor the ProSeqoNets require pre-trained word embeddings or vocabulary pruning. Instead, they can compute the sentence/word-level representations on the fly using projections. As such, aspects of the present disclosure can be viewed as compression techniques that effectively capture low-dimensional semantic text representation and produce compact models that save on storage and computational cost.

The systems, methods, and network structures provided by the present disclosure provide a number of technical effects and benefits. As one example technical effect and benefit, a projection network as described in this specification can perform tasks faster and with a performance level (e.g., a prediction accuracy) that is similar to that of much larger and more complex conventional neural networks (i.e., neural networks that do not contain projection layers, as described in this specification), while consuming fewer computational resources (e.g., memory and computing power). For example, in some cases, a projection network can perform tasks (e.g., text classification) with a performance level comparable to that of a larger neural network, despite the projection network having several orders of magnitude fewer parameters than the larger neural network.

Projection networks can perform tasks faster and consume fewer computational resources than conventional neural networks because they include projection layers.

Thus, the present disclosure provides Self-Governing Neural Nets (e.g., for on-device short text classification) and Projection Sequence Networks (e.g., for sequence labeling). Experimental data on multiple dialog act datasets shows that the SGNNs outperform state-of-the-art deep leaning methods. Further, the present disclosure introduces a compression technique that effectively captures low-dimensional semantic representation and produces compact models that significantly save on storage and computational cost. The proposed approaches do not rely on pre-trained embeddings and efficiently compute the projection vectors on the fly.

With reference now to the Figures, example embodiments of the present disclosure will be discussed in further detail.

Example Projection Networks and Projection Layers

FIG. 1 shows an example projection neural network system 100. The projection neural network system 100 is an example of a system implemented as computer programs on one or more computers in one or more locations in which the systems, components, and techniques described below are implemented.

The projection neural network system 100 includes a projection neural network 102. The projection neural network 102 can be a feed-forward neural network, a recurrent neural network, or any other appropriate type of neural network.

The projection neural network 102 is configured to receive a projection neural network input 104 and to generate a projection network output 106 from the projection network input 104. The projection neural network input 104 can be any kind of digital data input, and the projection network output 106 can be any kind of score, classification, or regression output based on the input.

The system 100 described herein is widely applicable and is not limited to one specific implementation. However, for illustrative purposes, a small number of example implementations are described below.

For example, if the inputs to the projection neural network 102 are images or features that have been extracted from images, the output generated by the projection neural network 102 for a given image may be scores for each of a set of object categories, with each score representing an estimated likelihood that the image contains an image of an object belonging to the category.

As another example, if the input to the projection neural network 102 is a sequence of text in one language, the output generated by the projection neural network 102 may be a score for each of a set of pieces of text in another language, with each score representing an estimated likelihood that the piece of text in the other language is a proper translation of the input text into the other language.

As another example, if the input to the projection neural network 102 is a sequence representing a spoken utterance, the output generated by the projection neural network 102 may be a score for each of a set of pieces of text, each score representing an estimated likelihood that the piece of text is the correct transcript for the utterance.

As another example, if the input to the projection neural network 102 is a sequence of physiological measurements, the output generated by the projection neural network 102 may be a score for each of a set of possible diagnoses for the condition of a user, with the score representing an estimated likelihood that the diagnosis is accurate.

As another example, if the input to the projection neural network 102 is a sequence of text from a received communication, the output generated by the projection neural network 102 may be a score for each of a set of possible responses to the received communication, with the score representing an estimated likelihood that the response matches a user's intent.

The projection neural network 102 includes a sequence of one or more projection layers (e.g., the projection layer 108). Although only a single projection layer 108 is illustrated, the projection neural network 102 can include any number of projection layers (e.g., stacked one after the other).

As will be described further with reference to FIG. 2, the projection layer 108 is configured to receive a projection layer input 110, and to process the projection layer input 110 in accordance with current values of projection layer parameters to generate a projection layer output 112. In general, the projection layer input 110 may be the projection network input 104 (i.e., if the projection layer 108 is the first layer in the projection network 102) or the output of another layer of the projection network 102 (e.g., a conventional layer or another projection layer). The projection layer input 110 and the projection layer output 112 may be represented in any appropriate numerical format, for example, as vectors or as matrices.

Figure 2:
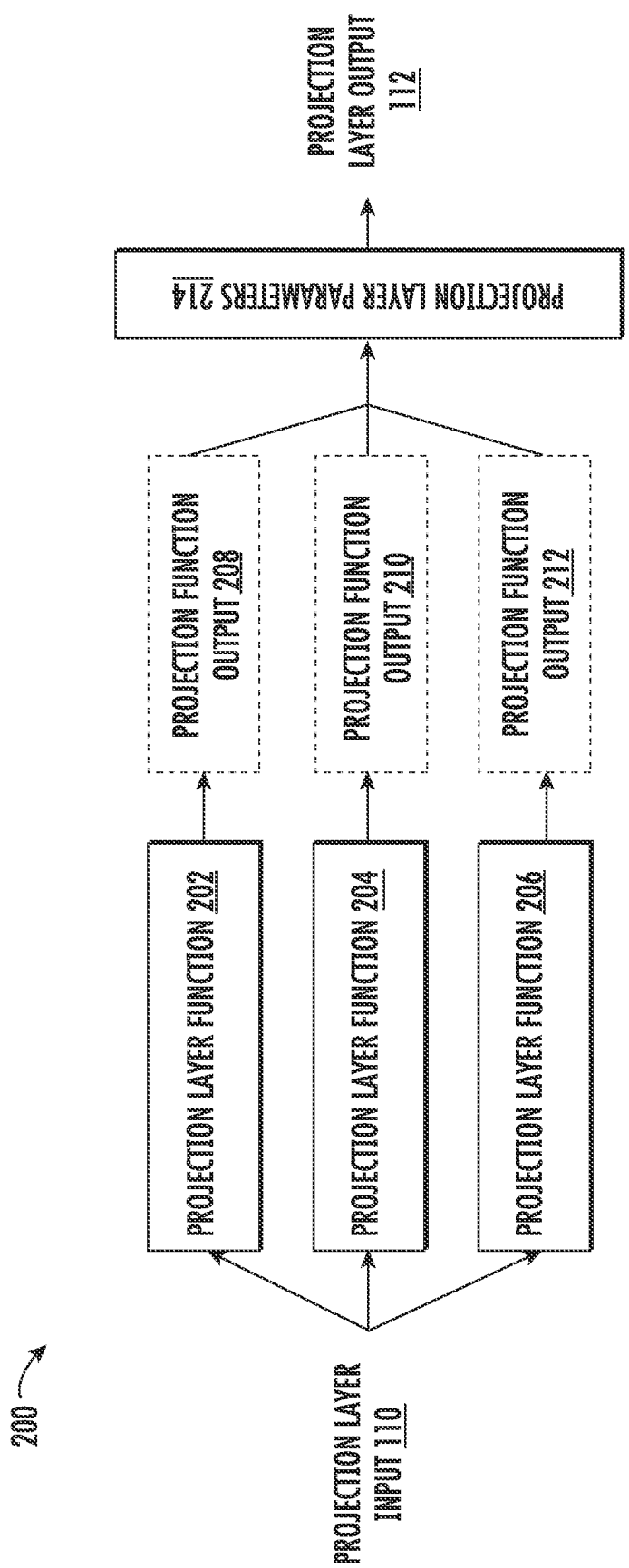
FIG. 2 depicts a block diagram of an example data flow for processing a projection layer input to determine a projection layer output according to example embodiments of the present disclosure.

FIG. 2 is a block diagram of an example data flow 200 by which a projection layer (e.g., the projection layer 108) can process a projection layer input 110 to determine a projection layer output 112.

As described earlier, the projection layer input may be the projection network input or the output of another layer of the projection network, and may be represented in any appropriate numerical format (e.g., as a vector or as a matrix).

The projection layer provides the projection layer input 110 to each of one or more projection layer functions (e.g., 202, 204, 206). Each of the projection layer functions processes the projection layer input 110 to generate a respective projection function output (e.g., 208, 210, 212).

In particular, each projection function can generate the corresponding projection function output by mapping the projection layer input to a different space. Generally, the dimensionality of the projection function outputs are much less (e.g., by several orders of magnitude) than the dimensionality of the projection layer input 110. In one example, each of the projection function outputs (e.g., 208, 210, 212) is a bit vector.

In some implementations, each projection function may be defined by a matrix. The rows (or columns) of a matrix defining a projection function can be referred to as projection vectors associated with the projection function. In some cases, a projection function may process the projection layer input by determining dot products (i.e., inner products) between the projection layer input and each of the projection vectors associated with the projection function. For example, for a projection function $\mathbb{P}$, the projection function output $\mathbb{P}(x)$ for projection layer input x (that is represented as a vector) may be determined as:

$$\mathbb{P}(x)=[<x,P_1>,<x,P_2>,\ldots,<x,P_n>] \quad (1)$$

where $<\cdot,\cdot>$ denotes the dot product operation between vectors, and $\{P_i\}_{i=1}^n$ are the projection vectors associated with the projection function $\mathbb{P}$.

In some implementations, a projection function may process the projection layer input by determining whether the dot product between the projection layer input and each of the projection vectors results in positive or negative values. When a dot product between the projection layer input and a projection vector results in a positive value, a first value may be assigned to a corresponding position in the projection function output. Conversely, when a dot product between the projection layer input and a projection vector results in a negative value, a second value may be assigned to a corresponding position in the projection function output.

For example, the projection function output $\mathbb{P}(x)$ for projection layer input x (that is represented as a vector) may be determined as:

$$\mathbb{P}(x)=[\text{sgn}(<x,P_1>),\text{sgn}(<x,P_2>),\ldots,\text{sgn}(<x,P_2>)] \quad (2)$$

where sgn(•) is the sign function, which outputs value 1 in response to receiving a positive input, and outputs value 0 in response to receiving a negative input. In this example, the projection function output is a binary representation (i.e., a vector with components consisting of 0s and 1s) of the projection layer input. By representing the projection function outputs as binary representations, the memory footprint of the projection network (i.e., the quantity of memory required to store and use the projection network) can be significantly reduced compared to conventional networks (i.e., where layer outputs are represented as real number representations instead of binary representations).

In some implementations, the projection functions may be locality sensitive hashing functions. Generally, a locality sensitive hashing function maps similar inputs to similar outputs. More specifically, a locality sensitive hashing function may be defined as a function $\mathbb{P}$ so that if a similarity between inputs $x_1$ and $x_2$ is defined by a mapping $\varphi(x_1, x_2)$ (e.g., a cosine similarity mapping) whose output value is between 0 and 1, then the probability that $\mathbb{P}(x_1)=\mathbb{P}(x_2)$ is equal to $\varphi(x_1, x_2)$. In some cases, the projection function defined by (2) may be an example of a locality sensitive hashing function.

One benefit of using locality sensitive hashing functions is that it allows projection of similar inputs or intermediate network layers into hidden unit vectors that are nearby in metric space. This allows transformation of the inputs and learning of an efficient and compact network representation that is only dependent on the inherent dimensionality (i.e., observed features) of the data rather than the number of instances or the dimensionality of the actual data vector (i.e., overall feature or vocabulary size). For example, this can be achieved with binary hash functions for the projection functions.

Projection functions may be selected so that: (i) processing a projection layer input by a projection function to generate a projection function output is computationally efficient (e.g., requires few arithmetic operations), (ii) data defining a projection function can be efficiently stored (e.g., in a logical data storage area or physical data storage device), or both.

For example, one or more of the projection functions may be defined by sparse matrices (i.e., matrices with only a few non-zero entries). If a projection function is defined by a sparse matrix, then processing the projection layer input by the projection function to generate the projection function output is computationally efficient. Specifically, since the results of many of the arithmetic operations involved in computing the projection function output have value zero (due to the sparsity of the matrix defining the projection function), these arithmetic operations do not actually need to be performed.

Moreover, if a projection function is defined by a sparse matrix, then the data defining the projection function can be efficiently stored. For example, a sparse matrix may be stored as a list of tuples, where each tuple includes an index of a location in the sparse matrix and a corresponding value of the sparse matrix at the index. Since sparse matrices have only a few non-zero entries, such a representation occupies less memory than, for example, a representation of a dense matrix that must include the index of every location in the dense matrix and the corresponding value of the dense matrix at the index.

As another example, the system may determine the values of the components of the matrices defining one or more of the projection functions based on the values of a set of seed parameters. The seed parameters are represented as numerical values and the number of seed parameters is typically much smaller than the dimensionality of the matrices defining the projection functions. The system may, for example, determine the values of the components of the matrices defining the projection functions based on the outputs of random (or pseudo-random) number generators that are initialized using the seed parameters. In this example, when the random (or pseudo-random) number generators are configured to generate Normally-distributed random numbers (i.e., random numbers drawn from a Normal distribution), the values of the components of the matrices defining the projection functions are approximately Normally-distributed.

By using seed parameters to determine the values of the components of the matrices defining the projection functions, the system can reduce the computational requirements of projection layers compared to conventional layers. For example, the system can reduce the amount of memory storage required for projection layers compared to conventional layers, since only the values of the seed parameters must be stored, as compared to some conventional layers that require storing entire dense matrices of conventional layer parameter values. As another example, the system can reduce the latency in generating layer outputs compared to conventional layers, since the system can dynamically compute the values of the components of the matrices defining the projection functions. In contrast, for some conventional layers, the system reads the conventional layer parameter values from memory, which may be a substantially slower process than dynamically computing these values (i.e., as in an example projection layer).

In some implementations, the values of the parameters defining the projection layer functions (e.g., the seed parameters or the values of the components of the projection vectors) may be predetermined, that is, may be fixed before the projection network is trained, and are not adjusted during training.

The projection layer can concatenate the projection function outputs and apply the projection layer parameters 214 (e.g., a parameter matrix and a bias vector) to the concatenated projection function outputs.

Thus, the projection layer can generate the projection layer output by applying projection layer parameters to the projection function outputs. For example, the projection layer parameters may include a parameter matrix and a bias vector, and the projection layer may generate the projection layer output y as:

$$y = W \cdot x + b \quad (3)$$

where W is the parameter matrix (i.e., so that W·x represents a matrix-vector multiplication), b is the bias vector, and x is the concatenation of the projection function outputs.

As described earlier, the dimensionality of the projection function outputs is generally much lower than the dimensionality of the projection layer input. Therefore, the number of projection layer parameters that are applied to the projection function outputs to generate the projection layer outputs is generally much lower than the number of parameters that are applied to layer inputs by conventional neural network layers (e.g., fully-connected layers) that do not include projection functions. For example, the dimensionality of the projection layer parameters defined by the parameter matrix W and the bias vector b in the projection layer may be much smaller than the dimensionality of the corresponding layer parameters of a conventional neural network layer.

Referring again to FIG. 1, according to an aspect of the present disclosure, in some implementations, the projection neural network 102 can include a stack of one or more additional hidden layers (e.g., hidden layer 114) connected to the sequence of one or more projection layers (e.g., projection layer 108). Although a single hidden layer 114 is shown, any number of additional hidden layers can be included in the network 102. The one or more hidden layers can include different types of layers including fully connected layers (e.g., featuring non-linear activations), recurrent layers, convolutional layers, additional projection layers, projection sequence layers (described in further detail below), other forms of additional layers, and/or various combinations thereof.

The sequence of the one or more additional hidden layers can be configured to receive a layer output generated by a highest projection layer in the sequence of one or more projection layers and to generate one or more additional hidden layer outputs. That is, each hidden layer (e.g., hidden layer 114) can receive a hidden layer input (e.g., hidden layer input 116) and process the layer input to provide a hidden layer output (e.g., hidden layer output 118).

Following the sequence of one or more hidden layers (e.g., hidden layer 114), the projection neural network 102 can include an output layer 120. The output layer 120 can be configured to receive the additional hidden layer output generated by a highest additional hidden layer in the sequence of one or more additional hidden layers and to generate the projection network output 106.

A layer of the projection network 102 can serve as the output layer 120 if the output of such layer is included in the projection network output 106. An output layer may be a softmax layer, a projection layer, or any other appropriate neural network layer. The output layer 120 may be configured to receive as input an output generated by a projection layer or a conventional layer.

The system 100 can be implemented in a resource-constrained environment (e.g., a smartwatch or smartphone) more readily than conventional neural network systems. For example, by including projection layers (e.g., the projection layer 108) in place of conventional neural network layers (e.g., fully-connected layers), data defining the parameters of the system 100 can occupy much less storage capacity than data defining the parameters of a conventional neural network system.

This specification describes the operations performed by a projection layer (e.g., as described with reference to FIG. 2) in the context of a projection neural network (e.g., as described with reference to FIG. 1). More generally, other systems, such as graph-based systems, can incorporate the operations performed by a projection layer. A graph is a data structure that may be represented by a set of nodes (where each node may be associated with a numerical feature vector), a set of edges (where each edge may be associated with a numerical edge strength value), and in some cases, a set of labels. The nodes represent entities (e.g., people, objects, locations, or concepts), the edges represent relationships between the entities represented by the nodes (e.g., a "friend" relationship between two people in a social network), and in some cases, the labels may represent characteristics of the nodes (e.g., whether a product represented by a node is a "best-selling" product).

Graph-based systems can be trained by machine learning techniques (e.g., supervised or semi-supervised machine learning techniques) to make predictions. For example, a graph-based system may generate a prediction for a value of a label associated with a previously unlabeled node in a graph. In this example, the graph-based system may generate a prediction for a value of a label associated with a given node based on the labels of the neighboring nodes (i.e., nodes that are connected to the given node by an edge) and the edge strengths of the edges connecting the given node to the neighboring nodes.

A graph-based system can incorporate the operations performed by a projection layer by, for example, generating a projection graph that is a compact representation of a trainer graph. Each node of the projection graph may correspond to a different node of the trainer graph, and the feature vectors associated with the nodes of the projection graph may be determined by performing projection layer operations. More specifically, the feature vector associated with a particular node of the projection graph may be determined by applying multiple projection functions followed by a transformation (e.g., defined by a parameter matrix and a bias vector) to the feature vector associated with the corresponding node in the trainer graph. In this manner, the feature vectors associated with the nodes of the projection graph may have a much smaller dimensionality than the feature vectors associated with the nodes of the trainer graph. Therefore, similar to a projection neural network, the projection graph may be suitable for deployment to resource constrained environments (e.g., mobile devices) where the trainer graph could not be deployed.

As mentioned above, the system 100 described herein is widely applicable and is not limited to one specific implementation. However, other examples of specific implementations (in addition to those described above) may be as described below.

For example, if the inputs to the projection neural network 102 are Internet resources (e.g., web pages), documents, or portions of documents or features extracted from Internet resources, documents, or portions of documents, the output generated by the projection neural network 102 for a given Internet resource, document, or portion of a document may be a score for each of a set of topics, with each score representing an estimated likelihood that the Internet resource, document, or document portion is about the topic.

As another example, if the inputs to the projection neural network 102 are features of an impression context for a particular advertisement, the output generated by the projection neural network 102 may be a score that represents an estimated likelihood that the particular advertisement will be clicked on.

As another example, if the inputs to the projection neural network 102 are features of a personalized recommendation for a user, e.g., features characterizing the context for the recommendation, e.g., features characterizing previous actions taken by the user, the output generated by the projection neural network 102 may be a score for each of a set of content items, with each score representing an estimated likelihood that the user will respond favorably to being recommended the content item.

Example Self-Governing Neural Networks

Example Models

Example implementations of the network structure shown in FIG. 1 include the Self-Governing network described herein. In particular, a Self-Governing neural network (SGNN) can include multi-layered locality-sensitive projection model. The self-governing property of this network stems from its ability to learn a model (e.g., a classifier) without having to initialize, load, or store any feature or vocabulary weight matrices. In this sense, the SGNN represents a truly embedding-free approach, which is in contrast with the majority of the widely-used state-of-the-art deep learning techniques in natural language processing whose performance depends on embeddings pre-trained on large corpora.

Instead, the SGNN uses the projection functions to dynamically transform each input to a low-dimensional representation. Furthermore, these projection layer(s) can be stacked with additional layers and non-linear activations to achieve deep, non-linear combinations of projections that permit the network to learn complex mappings from inputs $x_i$ to outputs $y_i$. One example of an SGNN network is represented mathematically below:

$$i_p = [\mathbb{P}^1(x_i), \ldots, \mathbb{P}^T(x_i)] \quad (4)$$

$$h_p = \sigma(W_p \cdot i_p + b_p) \quad (5)$$

$$h_t = \sigma(W_t \cdot h_{t-1} + b_t) \quad (6)$$

$$y_i = \text{softmax}(W_o \cdot h_k + b_o) \quad (7)$$

where $i_p$ refers to the output of projection operation applied to input $x_i$, $h_p$ is applied to projection output, $h_t$ is applied at intermediate layers of the network with depth k followed by a final softmax activation layer at the top. $W_p$, $W_t$, $W_o$ and $b_p$, $b_t$, $b_o$ represent trainable weights and biases respectively.

In some implementations, the projection transformations can use pre-computed parameterized functions, i.e., they are not trained during the learning process, and their outputs can be concatenated to form the hidden units for subsequent operations.

In some implementations, each input text $x_i$ can be converted to an intermediate feature vector (e.g., via raw text features such as skip-grams) followed by projections.

$$x_i \xrightarrow{\mathbb{F}} \vec{x_i} \xrightarrow{\mathbb{P}} [\mathbb{P}^1(x_i), \ldots, \mathbb{P}^T(x_i)] \quad (8)$$

As examples, the intermediate feature vector can include one or more of the following intermediate features generated from or associated with the input text: skip-grams; n-grams; part of speech tags; dependency relationships; knowledge graph information; and/or contextual information.

In some implementations, the SGNN network can be trained from scratch on the task data using a supervised loss defined with respect to ground truth $\hat{y}_i$. One example loss function that can be used is as follows:

$$\mathcal{L}(.) = \sum_{i \in N} \text{cross-entropy}(y_i, \hat{y}_i) \quad (9)$$

Figure 5A:
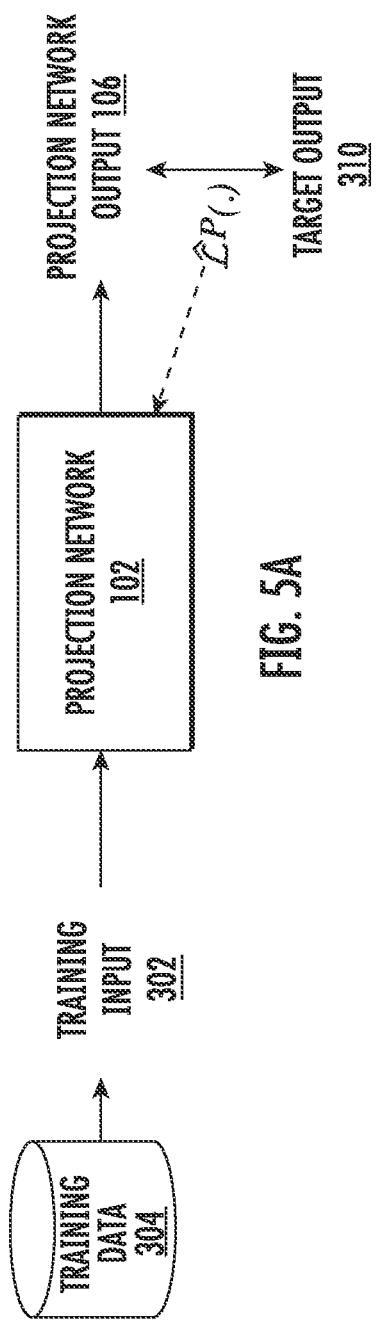
FIGS. 5A and 5B depict block diagrams of example data flows for training a projection neural network according to example embodiments of the present disclosure
Figure 5B:
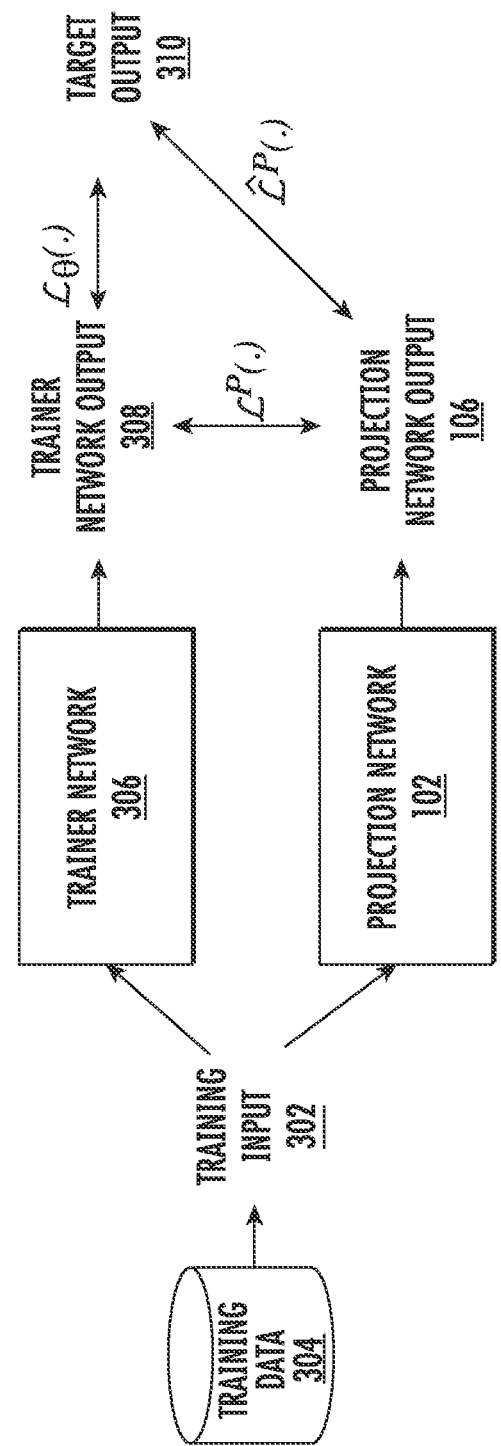

An example training structure according to the above-described scheme is provided in FIG. 5A. FIG. 5B shows an alternative training structure.

During training, the network learns to choose and apply specific projection operations $\mathbb{P}^j$ (via activations) that are more predictive for a given task. The choice of the type of projection matrix $\mathbb{P}$ as well as representation of the projected space $\Omega_\mathbb{P}$ has a direct effect on computation cost and model size. As described above, in some implementations, an efficient randomized projection method can be leveraged and a binary representation $\{0,1\}^d$ can be used for $\Omega_\mathbb{P}$. This yields a drastically lower memory footprint both in terms of number and size of parameters.

Computing Projections: In some implementations, an efficient randomized projection method can be employed for the projection step. For example, as described above, locality sensitive hashing (LSH) can be used to model the underlying projection operations in SGNN. LSH enables the network to project similar inputs $\vec{x}_i$ or intermediate network layers into hidden unit vectors that are nearby in metric space. In some implementations, repeated binary hashing can be used for $\mathbb{P}$ and the projection vectors can be applied to transform the input $\vec{x}_i$ to a binary hash representation denoted by $\mathbb{P}_k(\vec{x}_i) \in \{0,1\}$, where $[\mathbb{P}_k(\vec{x}_i)] := \text{sgn}[\langle \vec{x}_i, \mathbb{P}_k \rangle]$. This results in a d-bit vector representation, one bit corresponding to each projection row $\mathbb{P}_{k=1\ldots d}$.

The same projection matrix $\mathbb{P}$ is used for training and inference. Further, in some implementations, the random projection vector $\mathbb{P}_k$ never needs to be explicitly stored since they can be computed on the fly using hash functions over feature indices with a fixed row seed rather than invoking a random number generator. This also permit performance of projection operations that are linear in the observed feature size rather than the overall feature or vocabulary size which can be prohibitively large for high-dimensional data, thereby saving both memory and computation cost.

Thus, SGNN can efficiently model high-dimensional sparse inputs and large vocabulary sizes common for text applications instead of relying on feature pruning or other pre-processing heuristics employed to restrict input sizes in standard neural networks for feasible training. The binary representation is significant since this results in a significantly compact representation for the projection network parameters that in turn considerably reduces the model size.

SGNN Parameters: In some implementations, T different projection functions $\mathbb{P}^{j=1\ldots T}$ can be employed, each resulting in d-bit vector that is concatenated to form the projected vector $i_p$ in Equation (4). T and d can be varied depending on the projection network parameter configuration specified for P and can be tuned to trade-off between prediction quality and model size. Note that the choice of whether to use a single projection matrix of size T·d or T separate matrices of d columns depends on the type of projection employed (dense or sparse).

Figure 3:
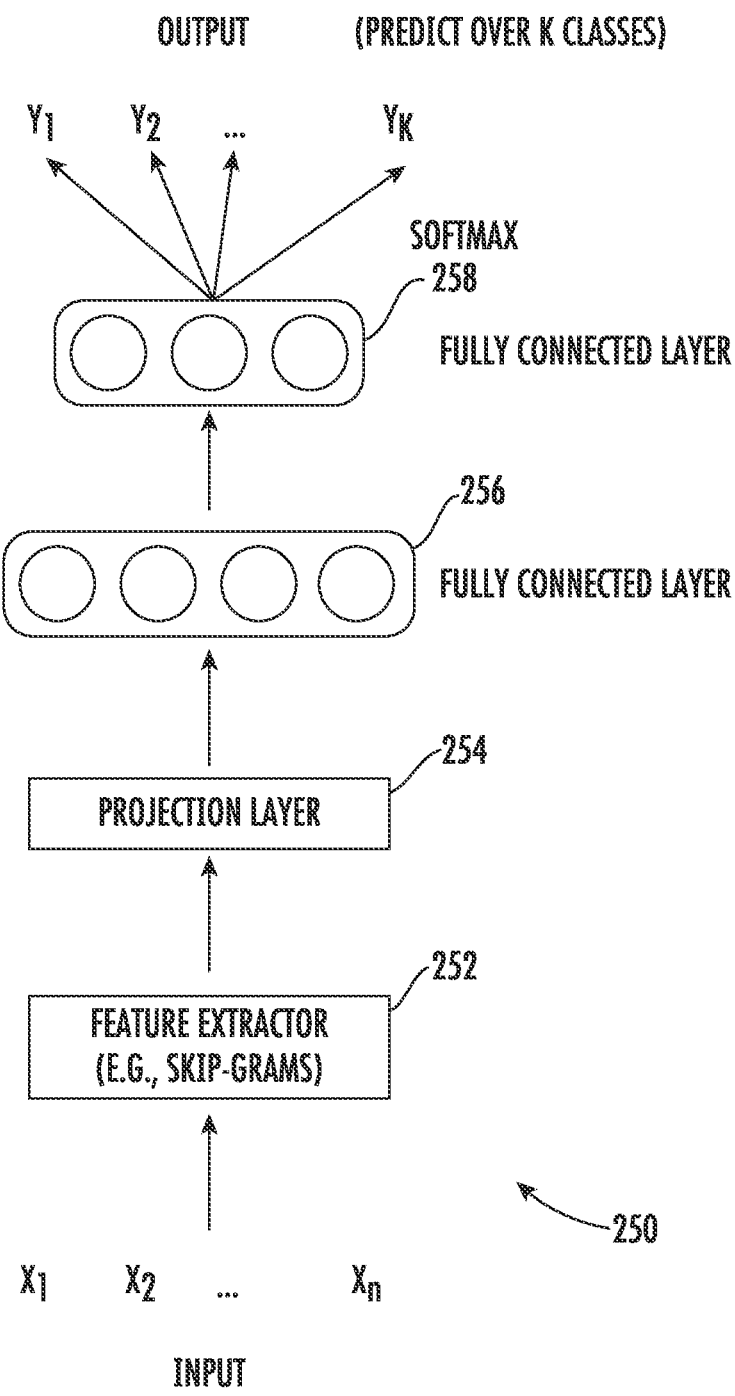
FIG. 3 depicts an example Self-Governing Neural Network according to example embodiments of the present disclosure.

FIG. 3 depicts an example SGNN 250 according to example embodiments of the present disclosure. The SGNN 250 receives an input, which, in some implementations, can be sequential in nature (e.g., words in a sequence). The SGNN 250 can first include a feature extractor 252. In some instances, the feature extractor 252 can be viewed as part of the network 250 while in other instances the feature extractor 252 is viewed as a pre-processing step for the network 250. The feature extractor 252 can extract an intermediate feature vector from the input. The feature extractor 252 can provide the intermediate feature vector to a projection layer 254.

Thus, in some implementations, the input to the projection layer 254 can include a single input vector that has been generated on the basis of the entire input $x_1, \ldots, x_n$ and additional features derived from or otherwise associated with the input. Such multiple types of information can be concatenated to form the single input vector. The SGNN 250 can process the single input vector to produce a classification output that classifies the input as a whole.

The projection layer 254 can project the received vector into a lower-dimensional space, for example as described with reference to FIG. 2. Following the projection layer 254, the example SGNN includes one additional hidden layer, shown here as a fully connected layer 256. Following the fully connected layer 256 is a softmax output layer 258. The output of the softmax layer 258 is a prediction (e.g., text classification) for the input over K classes.

Example Training and Inference

In some implementations, the compact bit units can be used to represent the projection in SGNN. During training, the network can learn to move the gradients for points that are nearby to each other in the projected bit space $\Omega_\mathbb{P}$ in the same direction.

In some implementations, the SGNN network can be trained end-to-end using backpropagation. Training can progress efficiently, for example, with stochastic gradient descent with distributed computing on high-performance CPUs or GPUs.

Complexity: The overall complexity for SGNN inference, governed by the projection layer, is O(n·T·d), where n is the observed feature size (not the overall vocabulary size) which is linear in input size, d is the number of LSH bits specified for each projection vector $\mathbb{P}_k$, and T is the number of projection functions used in $\mathbb{P}$. The model size (in terms of number of parameters) and memory storage required for the projection inference step is O(T·d·C), where C is the number of hidden units in $h_p$ in the multi-layer projection network.

Example Applications

One example task that can be performed by SGNNs is text classification. In the text classification task, the neural network is given text and/or intermediate features derived from text and considers all terms and/or features to make a single classification (e.g., binary or multi-class classification). Thus, in one example, the input is a text and the output is a class label.

Example applications of the classification task in natural language processing include: dialog act classification; humor & sarcasm detection; sentiment analysis; question classification; news headline classification; emotion recognition; health notifications; intent classification (dialog); and automated essay scoring.

Some samples of example text classification tasks and applications are as follows:

Dialog Act Classification

| Person Talking | Input | Output |
| --- | --- | --- |
| A | You're a, so you're a senior now | DECLARATIVE-QUESTION |
| B | Yeah | YES-ANSWER |

-continued

| Person Talking | Input | Output |
|---|---|---|
| B | I'm working on my projects trying to graduate | STATEMENT |
| A | Oh, good for you | APPRECIATION |
| B | Yeah | BACKCHANNEL |

Humor & Sarcasm Detection
Input: I love being ignored
Output: SARCASM
Sentiment Analysis
Input: The ravioli just keeps getting better every time I visit.
Output: POSITIVE
Question Classification
Input: How did serfdom develop in and then leave Russia?
Output: DESC:MANNER
Input: How much would it cost to purchase a 2footsquare party tent, with sides, ?
Output: NUM:MONEY
News Headline Classification
Input: TeleCorp confirms it is buying ad platform App-Corp, reportedly for between $1.6B$2B
Output: BUSINESS
Emotion Recognition
Input: Wow I never saw that coming!
Output: SURPRISE
Intent Classification (Dialog Systems)
Input: Play levels on YouTube
Output: INTENT_PLAY_SONG_ON_DEVICE_NAME Example Datasets and Experimental Setup for SGNN Experiments Data Description
Example experimental evaluations were conducted on two dialog act benchmark datasets: SWDA and MRDA.
Switchboard Dialog Act Corpus (SwDA) is a popular open domain dialogs corpus between two speakers with 42 dialogs acts. (See Godfrey et al., 1992. Switchboard: Telephone speech corpus for research and development. In *Proceedings of the* 1992 *IEEE International Conference on Acoustics, Speech and Signal Processing*—Volume 1, ICASSP'92, pages 517-520. IEEE Computer Society; and Jurafsky et al., 1997. Automatic detection of discourse structure for speech recognition and understanding. In *Proceedings of IEEE Workshop on Automatic Speech Recognition and Understanding*, pages 88-95)
ICSI Meeting Recorder Dialog Act Corpus (MRDA) is a dialog corpus of multiparty meetings with 5 tags of dialog acts. (See Adam et al., 2003. The icsi meeting corpus. In *Proceedings of the 5TH SIGdial Workshop on Discourse and Dialogue*, pages 364-367; and Shriberg et al., 2004. The icsi meeting recorder dialog act (mrda) corpus. In *Proceedings of the 5th SIGdial Workshop on Discourse and Dialogue*, pages 97-100, Cambridge, Mass., USA. Association for Computational Linguistics).
Table 1 summarizes dataset statistics. The train, validation and test splits were used as defined in Lee and Dernoncourt. 2016. Sequential short-text classification with recurrent and convolutional neural networks. In *Proceedings of the 2016 Conference of the North American Chapter of the Association for Computational Linguistics: Human Language Technologies*, pages 515-520; and Ortega and Vu. 2017. Neural-based context representation learning for dialog act classification. In *Proceedings of the* 18*th Annual SIGdial Meeting on Discourse and Dialogue*, pages 247-252.

TABLE 1

Dialog Act Datasets Statistics

| Datasets | Class | Vocab. | Train | Validation | Test |
|---|---|---|---|---|---|
| SwDA | 42 | 20K | 193K | 23K | 5K |
| MRDA | 5 | 12K | 78K | 16K | 15K |

Example Experimental Setup
The experimental evaluations were set up as follows: given a classification task and a dataset, generate an on-device model. The size of the model can be configured (by adjusting the projection matrix $\mathbb{P}$) to fit in the memory footprint of the device, e.g., a phone has more memory compared to a smart watch. For each classification task, the Accuracy is reported on the test set.
Example Hyperparameters and Training
For all datasets the following was used: SGNN ($\mathbb{P}_{T=80, d=14}$×FullyConnected$_{256}$×FullyConnected$_{256}$), mini-batch size of 100, dropout rate of 0.25, learning rate was initialized to 0.025 with cosine annealing decay. Unlike prior approaches that rely on pre-trained word embeddings, the projection weights were learned on the fly during training. As such, word embeddings (or vocabularies) do not need to be stored. Instead, features are computed on the fly and are dynamically compressed via the projection matrices into projection vectors. These values were chosen via a grid search on development sets, no other dataset-specific tuning was performed. Training was performed through stochastic gradient descent over shuffled mini-batches with Nesterov momentum optimizer, run for 1M steps.

Example Experimental Results for SGNN Experiments

Tables 2 and 3 show example experimental results on the SwDA and MRDA dialog act datasets. Overall, the example implementation of the SGNN model architecture consistently outperforms the baselines and prior state-of-the-art deep learning models.
Example Baselines
The SGNN model implementation was compared against a majority class baseline and Naive Bayes classifier (Lee and Dernoncourt. 2016. Sequential short-text classification with recurrent and convolutional neural networks. In *Proceedings of the* 2016 *Conference of the North American Chapter of the Association for Computational Linguistics: Human Language Technologies*, pages 515-520). The SGNN implementation significantly outperforms both baselines by 12 to 35% absolute.
Example Comparison Against State-of-Art Methods
The SGNN's performance was also compared against prior work using HMMs (Stolcke et al., 2000. Dialogue act modeling for automatic tagging and recognition of conversational speech. *Comput. Linguist.*, 26(3):339-373) and recent deep learning methods like CNN (Lee and Dernoncourt. 2016. Sequential short-text classification with recurrent and convolutional neural networks. In *Proceedings of the* 2016 *Conference of the North American Chapter of the Association for Computational Linguistics: Human Language Technologies*, pages 515-520), RNN (Khanpour et al., 2016. Dialogue act classification in domain-independent conversations using a deep recurrent neural network. In *Proceedings of COLING 2016, the 26th International Conference on Computational Linguistics: Technical Papers*, pages 2012-2021) and RNN with gated attention (Tran et al., 2017. A generative attentional neural network model for dialogue act classification. In *Proceedings of the 55th Annual Meeting of the Association for Computational Linguistics (Volume 2: Short Papers)*, pages 524-529). (Lee and Dernoncourt. 2016. Sequential short-text classification with recurrent and convolutional neural networks. In *Proceedings of the 2016 Conference of the North American Chapter of the Association for Computational Linguistics: Human Language Technologies*, pages 515-520; Ortega and Vu. 2017. Neural-based context representation learning for dialog act classification. In *Proceedings of the 18th Annual SIGdial Meeting on Discourse and Dialogue*, pages 247-252; Tran et al. 2017. A generative attentional neural network model for dialogue act classification. In *Proceedings of the 55th Annual Meeting of the Association for Computational Linguistics (Volume 2: Short Papers)*, pages 524-529) are the latest approaches in dialog act classification, which also reported on the same data splits. Therefore, comparison is made against these works.

For both SwDA and MRDA datasets, the SGNN obtains the best result of 83.1 and 86.7 accuracy outperforming prior state-of-the-art work. This is very impressive given that the SGNN works with very small memory footprint and also does not rely on pre-trained word embeddings. The results also show that the proposed method is very effective for such natural language tasks compared to more complex neural network architectures such as deep CNN (Lee and Dernoncourt. 2016. Sequential short-text classification with recurrent and convolutional neural networks. In *Proceedings of the 2016 Conference of the North American Chapter of the Association for Computational Linguistics: Human Language Technologies*, pages 515-520) and RNN variants (Khanpour et al., 2016. Dialogue act classification in domain-independent conversations using a deep recurrent neural network. In *Proceedings of COLING 2016, the 26th International Conference on Computational Linguistics: Technical Papers*, pages 2012-2021; Ortega and Vu. 2017. Neural-based context representation learning for dialog act classification. In *Proceedings of the 18th Annual SIGdial Meeting on Discourse and Dialogue*, pages 247-252). The compression techniques like locality sensitive projections jointly coupled with non-linear functions are effective at capturing low-dimensional semantic text representations that are useful for text classification applications.

Example Discussion on Model Size and Inference

LSTMs have millions of parameters, while the example implementation of the SGNN architecture has just 300K parameters (order of magnitude lower). Most deep learning methods also use large vocabulary size of 10K or higher. Each word embedding is represented as 100-dimensional vector leading to a storage requirement of 10,000×100 parameter weights just in the first layer of the deep network. In contrast, SGNNs in all the example experiments use a fixed 1120-dimensional vector regardless of the vocabulary or feature size, dynamic computation results in further speed up for high-dimensional feature spaces. This amounts to a huge savings in storage and computation cost wrt FLOPS (floating point operations per second).

TABLE 2

SwDA Dataset Results

| Method | Accuracy |
|---|---|
| Majority Class (baseline) (Ortega and Vu. 2017. Neural-based context representation learning for dialog act classification. In *Proceedings of the 18th Annual SIGdial Meeting on Discourse and Dialogue*, pages 247-252) | 33.7 |
| Naive Bayes (baseline) (Khanpour et al., 2016. Dialogue act classification in domain-independent conversations using a deep recurrent neural network. In *Proceedings of COLING 2016, the 26th International Conference on Computational Linguistics: Technical Papers*, pages 2012-2021) | 47.3 |
| HMM (Stolcke et al., 2000. Dialogue act modeling for automatic tagging and recognition of conversational speech. *Comput. Linguist.*, 26(3):339-373) | 71.0 |
| DRLM-conditional training (Ji and Bilmes. 2006. Backoff model training using partially observed data: Application to dialog act tagging. In *Proceedings of the Main Conference on Human Language Technology Conference of the North American Chapter of the Association of Computational Linguistics*, HLT-NAACL '06, pages 280-287) | 77.0 |
| DRLM-joint training (Ji and Bilmes. 2006. Backoff model training using partially observed data: Application to dialog act tagging. In *Proceedings of the Main Conference on Human Language Technology Conference of the North American Chapter of the Association of Computational Linguistics*, HLT-NAACL '06, pages 280-287) | 74.0 |
| LSTM (Lee and Dernoncourt. 2016. Sequential short-text classification with recurrent and convolutional neural networks. In *Proceedings of the 2016 Conference of the North American Chapter of the Association for Computational Linguistics: Human Language Technologies*, pages 515-520) | 69.9 |
| CNN (Lee and Dernoncourt. 2016. Sequential short-text classification with recurrent and convolutional neural networks. In *Proceedings of the 2016 Conference of the North AmericanChapter of the Association for Computational Linguistics: Human Language Technologies*, pages 515-520) | 73.1 |

TABLE 2-continued

SwDA Dataset Results

| Method | Accuracy |
| --- | --- |
| Gated-Attention & HMM<br>(Tran et al., 2017. A generative attentional neural network model for dialogue act classification. In *Proceedings of the 55th Annual Meeting of the Association for Computational Linguistics* (*Volume 2: Short Papers*), pages 524-529) | 74.2 |
| RNN + Attention<br>(Ortega and Vu. 2017. Neural-based context representation learning for dialog act classification. In *Proceedings of the 18th Annual SIGdial Meeting on Discourse and Dialogue*, pages 247-252) | 73.8 |
| RNN<br>(Khanpour et al., 2016. Dialogue act classification in domain-independent conversations using a deep recurrent neural network. In *Proceedings of COLING 2016, the 26th International Conference on Computational Linguistics: Technical Papers*, pages 2012-2021) | 80.1 |
| Self-Governing Neural Nets | 83.1 |

TABLE 3

MRDA Dataset Results

| Method | Accuracy |
| --- | --- |
| Majority Class (baseline)<br>(Ortega and Vu. 2017. Neural-based context representation learning for dialog act classification. In *Proceedings of the 18th Annual SIGdial Meeting on Discourse and Dialogue*, pages 247-252) | 59.1 |
| Naive Bayes (baseline)<br>(Khanpour et al. 2016. Dialogue act classification in domain-independent conversations using a deep recurrent neural network. In *Proceedings of COLING 2016, the 26th International Conference on Computational Linguistics: Technical Papers*, pages 2012-2021) | 74.6 |
| Graphical Model<br>(Ji and Bilmes. 2006. Backoff model training using partially observed data: Application to dialog act tagging. In *Proceedings of the Main Conference on Human Language Technology Conference of the North American Chapter of the Association of Computational Linguistics*, HLT-NAACL '06, pages 280-287) | 81.3 |
| CNN<br>(Lee and Dernoncourt. 2016. Sequential short-text classification with recurrent and convolutional neural networks. In *Proceedings of the 2016 Conference of the North American Chapter of the Association for Computational Linguistics: Human Language Technologies*, pages 515-520) | 84.6 |
| RNN + Attention<br>(Ortega and Thang Vu. 2017. Neural-based context representation learning for dialog act classification. In *Proceedings of the 18th Annual SIGdial Meeting on Discourse and Dialogue*, pages 247-252) | 84.3 |
| RNN<br>(Khanpour et al. 2016. Dialogue act classification in domain-independent conversations using a deep recurrent neural network. In *Proceedings of COLING 2016, the 26th International Conference on Computational Linguistics: Technical Papers*, pages 2012-2021) | 86.8 |
| Self-Governing Neural Nets | 86.7 |

Example Projection Sequence Networks (ProSeqoNets)

Another example projection neural network architecture provided by the present disclosure is Projection Sequence Networks (ProSeqoNets). ProSeqoNets can include one or more projection layers followed by, for example, one or more projection sequence layers. Each projection sequence layer can pass information forward and/or backward to subsequent and/or previous iterations of such layer as a sequential input is input into the network over a series of time steps. For example, each projection sequence layer can include a first set of nodes that pass information forward to subsequent iterations and/or receive information from previous iterations and also a second set of nodes that receive information passed back from subsequent iterations and/or pass information backward to previous iterations.

Figure 4:
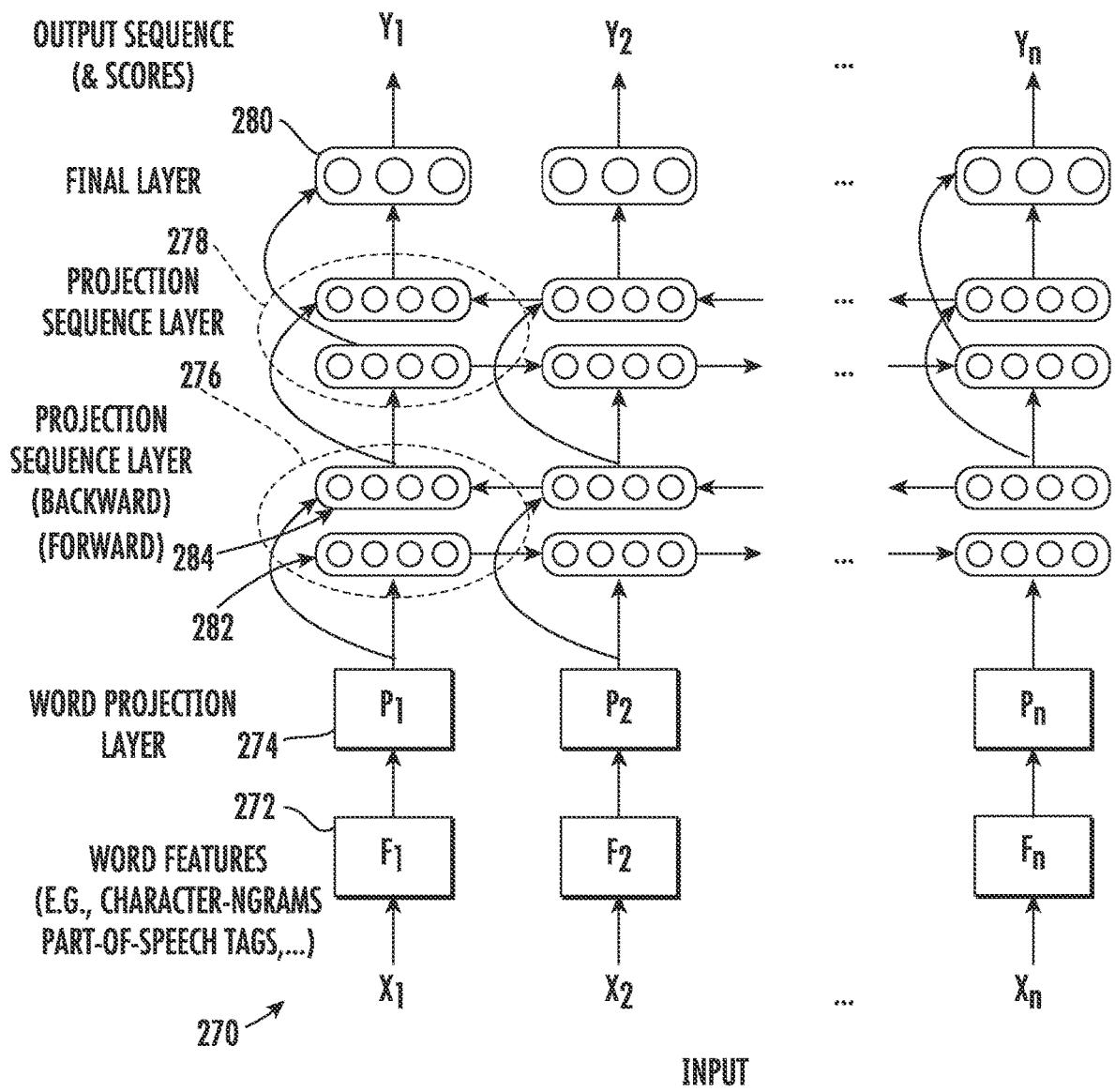
FIG. 4 depicts an example Projection Sequence Network according to example embodiments of the present disclosure.

FIG. 4 depicts an example projection sequence network 270 according to example embodiments of the present disclosure. In particular, FIG. 4 depicts n iterations of the projection sequence network 270 implemented over n times steps relative to n inputs from a sequential input source.

Thus, in some implementations, the input to projection sequence network 270 can be sequential in nature and the projection sequence network 270 can operate iteratively (e.g., at each of a plurality of time steps) to process the sequential input. As one example, as illustrated in FIG. 4, for sequential input $x_1, \ldots, x_n$, one input portion $x_i$ of the input can be input at each of a plurality of iterations. For example, at time step 2, input portion $x_i$ can be input. At each iteration, information from past time steps (e.g., the raw text and/or intermediate feature data) may or may not also be provided alongside the newly provided portion.

The projection sequence network 270 can include a feature extractor 272. The feature extractor 272 can extract an intermediate feature vector from the input. The feature extractor 272 can provide the intermediate feature vector to a projection layer 274. In some instances, the feature extractor 272 can be viewed as part of the network 270 while in other instances the feature extractor 272 is viewed as a pre-processing step for the network 270.

Thus, in some implementations, additional features can be provided as initial or intermediate input to the projection layer 274 in addition to the base input. In some implementations, these additional features can be included in one or more additional feature vectors. Thus, in some implementations, the input to the projection layer 274 can include multiple feature vectors which may expressed according to different dimensions. These feature vectors may or may not include type information that describes the type of features.

In implementations in which the input to projection layer 274 includes multiple feature vectors, input of such vectors into the network can be handled in a number of different ways. As one example, the multiple feature vectors can be concatenated and flattened to form a single input vector. In other implementations, at each time step, each feature vector can be separately input into the projection layer 274 and separately projected by the projection layer 274. After separate projection, the outputs of the projection layer 274 can be concatenated in the projected space (e.g., the bit space). In some implementations, some projection functions and/or bit space positions can be reserved and used for encoding the type information respectively associated with the feature vectors, such that the network 270 (e.g., the lowest projection sequence layer 276) can learn, in the projected space, to choose or ignore various information based on its feature type as it relates to the input or other feature types.

Thus, the projection layer 274 can project the received vector into a lower-dimensional space, for example as described with reference to FIG. 2. Following the projection layer 274, the example projection sequence network 270 includes two projection sequence layers, shown here as projection sequence layers 276 and 278. Although two projection sequence layers are shown, the network can include any number of projection sequence layer(s). Following the projection sequence layer 278 is a final layer 280. The output of the final layer 280 (e.g., over the time steps) is an output sequence (and scores).

Each projection sequence layer (e.g., 276, 278) can pass information forward and/or backward to subsequent and/or previous iterations of such layer as a sequential input is input into the network over a series of time steps. For example, each projection sequence layer can include a first set of nodes that pass information forward to subsequent iterations and/or receive information from previous iterations and also a second set of nodes that receive information passed back from subsequent iterations and/or pass information backward to previous iterations. To illustrate, projection sequence layer 276 includes a first set of nodes 282 that pass internal state information from time step 1 to themselves in the subsequent iteration of the layer 276 at time step 2. Projection sequence layer 276 includes a second set of nodes 284 that receive internal state information from time step 2 from the same nodes but in the subsequent iteration of the layer 276 at time step 2. Although not shown with the sets of nodes 282, 284, but as can be seen at the iteration of the layer 276 at the time step 2, information can be passed and received in both temporal directions by the same sets of nodes.

In some implementations, one or more (e.g., all) of the nodes included in the first set of nodes 282 and/or the second set of nodes 284 can be or include recurrent cells that have been modified for inclusion in the projection sequence layer. Example recurrent cells include LSTM cells and gated recurrent units (GRUs). In particular, in the modified recurrent cells, the projection state can be used to modify the internal state or dependencies of the cell rather than the base input features.

One example task that can be performed by ProSeqoNets is sequence labeling. In the sequence labeling task, the neural network is given text and/or intermediate features derived from text and identifies segments (e.g., sequences of words/phrases) and classifies those segments into multiple classes. Thus, in one example, the input is a text and the output is labeled sequences.

Example applications of the sequence labeling task in natural language processing include: named entity recognition; keyphrase extraction; noun phrase extraction; chunking; relation extraction; semantic parsing; slot extraction in dialog systems; product (shopping) & attribute extraction; and aspect based sentiment analysis. Additional example applications of the ProSeqoNets include translating text between languages; text completion (e.g., sentence completion and/or automatic reply); or other generative tasks. Some example tasks and applications are as follows.

Named Entity Recognition:
Input: The University of Southern California is located in Los Angeles.
Output: The [University of Southern California]_Organization is located in [Los Angeles]_Location KeyPhrase extraction (useful for advertising and content understanding):
Input: We offer a wide variety of items including healthy dry cat food for $5.
Output: We offer a wide variety of items including [healthy dry cat food]_KeyPhrase for $5.

Noun Phrase Extraction:
Input: Huge hurricanes struck the coast of Japan.
Output: [Huge hurricanes] Noun_Phrase struck [the coast] Noun_Phrase of [Japan] Noun_Phrase Chunking:
Input: Huge hurricanes struck the coast of Japan.
Output: [Huge hurricanes]_Noun_Phrase [struck]_Verb_Phrase [[the coast]_Noun_Phrase [of]_Prep [Japan]_Noun_Phrase]]_Prep_Noun_Phrase Relation Extraction:
Input: CorporationA was acquired by CorporationB to create synergies.
Output: [[CorporationA]_e1 was acquired by [CorporationB]_e2]_purchase(e2,e1) to create synergies.

Semantic Parsing:
Input: Remind me to set the timer to 5.
Output: [Remind]_Evoking [me]_Creator to [set]_Intentionally_Create [the timer]_Created_Entity to 5.

Slot Extraction in Dialog Systems:
Input: Reserve a flight from San Francisco to LAX for two people after 3 pm.
Output: [Reserve a flight]_Book_Flight_Intent from [San Francisco]_FromDestination:Location/Airport to [LAX]_ToDestination:Location/Airport for [two people]_Number_of_People after [3 pm]_Date_and_Time.

Product (Shopping) & Attribute Extraction:
Input: This expensive shirt ripped all the way to my shoulder, the fabric is too soft.

Output: This [expensive]_price [shirt]_product ripped all the way to my shoulder, the [fabric]_textile was too soft and runs [small]_size.

Aspect based Sentiment Analysis:

The task is to identify every entity E and attribute A pair towards which an opinion is expressed in the given text.

Input: The flank steak was great, but the service was horrible.

Output: The [flank steak]_Sentiment:Positive was great, but the [service]_Sentiment:Negative and [ambience]_Sentiment:Negative were horrible.

Translation:

Input: I like to dance the tango.

Output: Me gusta bailar el tango.

Text Completion/Generation:

Input: A zebra has black and white

Output: stripes

Example Training Schemes

FIG. 5A is a block diagram of an example data flow by which a projection neural network system (e.g., the projection neural network system 100) can train a projection neural network (e.g., the projection neural network 102). As part of the training, the system provides a training input 302 from a set of training data 304 to the projection network 102. The projection network 102 processes the training input 302 in accordance with current values of projection network parameters to generate a projection network output 106. The system updates the current values of the projection network parameters by computing a gradient (e.g., by a backpropagation procedure) of a loss functions that depends on the projection network output 106 and a target output 310. As an example, the system can update the current values of the projection network parameters by a gradient of a loss function $\widehat{\mathcal{L}^P}$ (referred to as a projection prediction loss function) that depends on an error between the projection network output 106 and the target output 310. Updating the current values of the projection network parameters by the gradient of the projection prediction loss function $\widehat{\mathcal{L}^P}$ can cause the projection network 102 to generate an output that is more similar to the target output 310 (i.e., in response to processing the training input 302). Thus, in some implementations, the projection neural network 302 can be trained based solely on its own performance relative to the training data 304 as compared with the target output.

FIG. 5B is a block diagram of an alternative example data flow by which a projection neural network system (e.g., the projection neural network system 100) can train a projection neural network (e.g., the projection neural network 102).

As part of the training, the system provides a training input 302 from a set of training data 304 to the projection network 102. The projection network 102 processes the training input 302 in accordance with current values of projection network parameters to generate a projection network output 106. The system provides the same training input 302 to a trainer network 306. The trainer network 306 processes the training input 302 in accordance with current values of trainer network parameters to generate a trainer network output 308. The trainer network 306 can be a feed-forward neural network, a recurrent neural network, or any other appropriate type of neural network that is configured to generate the same kinds of outputs as the projection network 102 given the same training input. In general, the trainer network 306 has more parameters (in some cases, by several orders of magnitude) than the projection network 102.

The system jointly updates the current values of the projection network parameters and the trainer network parameters by computing gradients (e.g., by a backpropagation procedure) of a combination of several different loss functions. The loss functions can depend on the projection network output 106, the trainer network output 308, or both.

For example, the system can update the current values of the trainer network parameters by a gradient of a loss function $\mathcal{L}_\theta$ (referred to as a trainer prediction loss function) that depends on an error between the trainer network output 308 and the target output 310 associated with the training input 302 in the training data 304. The target output 310 is an output that should be generated by the trainer neural network 306 and the projection network 102 in response to processing the training input 302. Updating the current values of the trainer network parameters by the gradient of the trainer prediction loss function $\mathcal{L}_\theta$ can cause the trainer network 306 to generate an output that is more similar to target output 310 (i.e., in response to processing the training input 302).

As another example, the system can update the current values of the projection network parameters by a gradient of a loss function $\widehat{\mathcal{L}^P}$ (referred to as a projection prediction loss function) that depends on an error between the projection network output 106 and the target output 310. Updating the current values of the projection network parameters by the gradient of the projection prediction loss function $\widehat{\mathcal{L}^P}$ can cause the projection network 102 to generate an output that is more similar to the target output 310 (i.e., in response to processing the training input 302).

As another example, the system can also update the current values of the projection network parameters (and, optionally, the trainer network parameters) by a gradient of a loss function $\mathcal{L}^P$ (referred to as a projection simulation loss function) that depends on an error between the trainer network output 308 and the projection network output 106. Updating the current values of the projection network parameters by the gradient of the projection simulation loss function $\mathcal{L}^P$ can cause the projection network 102 to generate an output that is more similar to the trainer network output 308. By updating the values of the projection network parameters based on the projection simulation loss function $\mathcal{L}^P$, the system can (in some cases) enable the projection network 102 to generate predictions that are similar in accuracy to the predictions generated by the trainer network 306, despite the projection network 102 having far fewer parameters (e.g., in some cases, by several orders of magnitude) than the trainer network 306.

Generally, the trainer prediction loss function $\mathcal{L}_\theta$, the projection prediction loss function $\widehat{\mathcal{L}^P}$, and the projection simulation loss function $\mathcal{L}^P$ can be any appropriate loss functions. For example, if the trainer network 306 and the projection network 102 perform classification tasks, then the loss functions may be cross-entropy loss functions. As another example, if the trainer network 306 and the projection network 102 perform regression tasks, then the loss functions may be squared-error loss functions. The system may adjust the parameters of the projection network 102 and the trainer network 306 by a weighted combination of gradients of each of the described loss functions.

A graph-based system, as described earlier, that generates a projection graph as a compact representation of a trainer graph, can jointly train the projection graph, the trainer graph, and the parameters of the projection layer operations used to determine the projection graph from the trainer graph. In a particular example, the parameters of the projection layer operations can be trained (e.g., by a backpropagation procedure) to cause the predictions generated by the graph-based system based on the projection graph to become more similar to the predictions generated by the graph-based system based on the trainer graph. The similarity between predictions may be measured by a loss function, such as a cross-entropy loss function. The predictions generated by the graph-based system based on the projection graph and the trainer graph may be predicted labels for labeled or unlabeled nodes in the projection graph and trainer graph respectively.

Example Devices and Systems

Figure 6A:
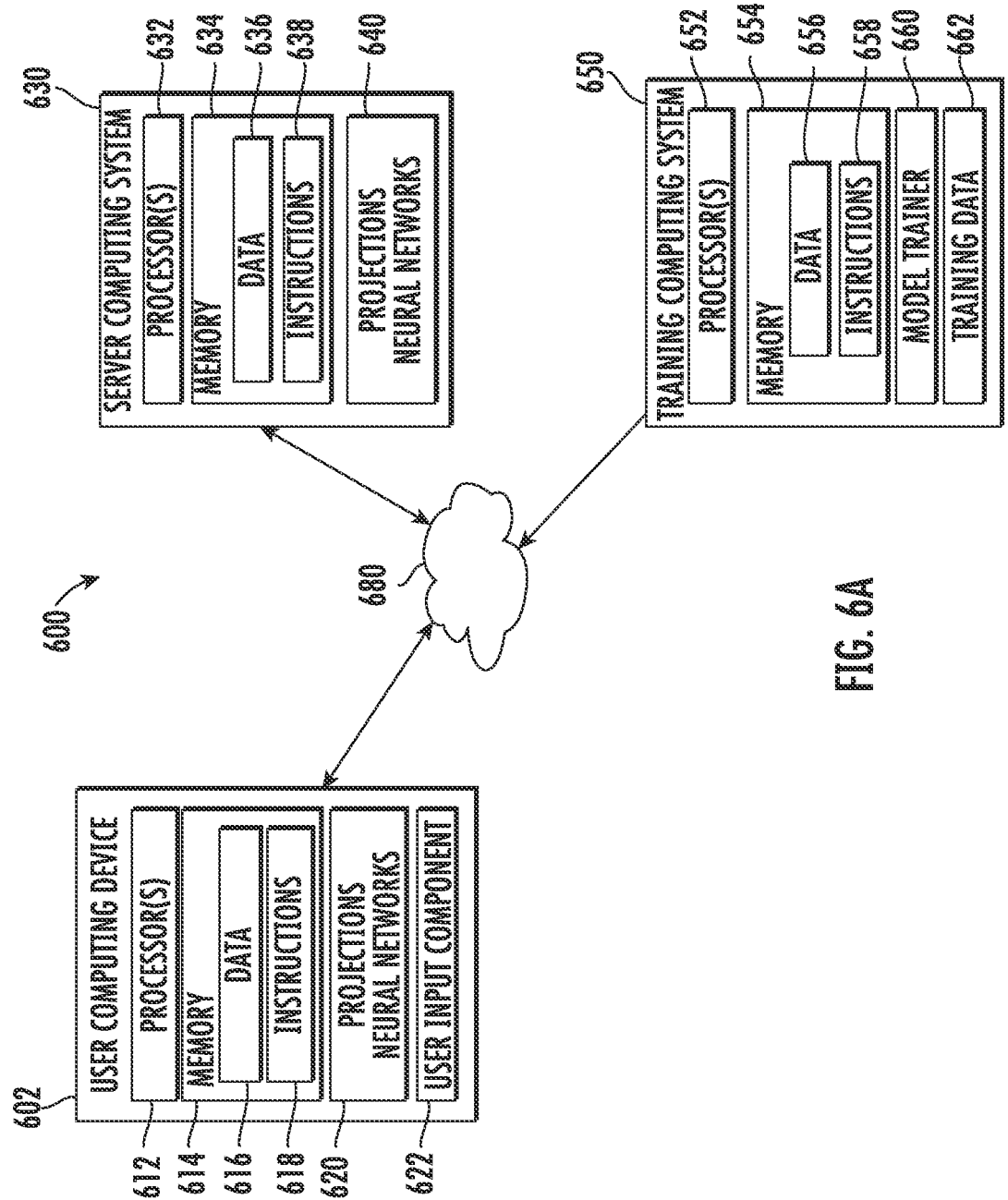
FIGS. 6A-C depict block diagrams of example computing systems and devices according to example embodiments of the present disclosure.

FIG. 6A depicts a block diagram of an example computing system 600 according to example embodiments of the present disclosure. The system 600 includes a user computing device 602, a server computing system 630, and a training computing system 650 that are communicatively coupled over a network 680.

The user computing device 602 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 602 includes one or more processors 612 and a memory 614. The one or more processors 612 can be any suitable processing device (e.g., a processor core, a microprocessor, an ASIC, a FPGA, a controller, a microcontroller, etc.) and can be one processor or a plurality of processors that are operatively connected. The memory 614 can include one or more non-transitory computer-readable storage mediums, such as RAM, ROM, EEPROM, EPROM, flash memory devices, magnetic disks, etc., and combinations thereof. The memory 614 can store data 616 and instructions 618 which are executed by the processor 612 to cause the user computing device 602 to perform operations.

In some implementations, the user computing device 602 can store or include one or more projection neural networks 620. For example, the projection neural networks 620 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Example projection neural networks 620 are discussed with reference to FIGS. 1-4.

In some implementations, the one or more projection neural networks 620 can be received from the server computing system 630 over network 680, stored in the user computing device memory 614, and then used or otherwise implemented by the one or more processors 612. In some implementations, the user computing device 602 can implement multiple parallel instances of a single projection neural network 620.

Additionally or alternatively, one or more projection neural networks 640 can be included in or otherwise stored and implemented by the server computing system 630 that communicates with the user computing device 602 according to a client-server relationship. For example, the projection neural networks 640 can be implemented by the server computing system 640 as a portion of a web service. Thus, one or more projection neural networks 620 can be stored and implemented at the user computing device 602 and/or one or more projection neural networks 640 can be stored and implemented at the server computing system 630.

The user computing device 602 can also include one or more user input component 622 that receives user input. For example, the user input component 622 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 630 includes one or more processors 632 and a memory 634. The one or more processors 632 can be any suitable processing device (e.g., a processor core, a microprocessor, an ASIC, a FPGA, a controller, a microcontroller, etc.) and can be one processor or a plurality of processors that are operatively connected. The memory 634 can include one or more non-transitory computer-readable storage mediums, such as RAM, ROM, EEPROM, EPROM, flash memory devices, magnetic disks, etc., and combinations thereof. The memory 634 can store data 636 and instructions 638 which are executed by the processor 632 to cause the server computing system 630 to perform operations.

In some implementations, the server computing system 630 includes or is otherwise implemented by one or more server computing devices. In instances in which the server computing system 630 includes plural server computing devices, such server computing devices can operate according to sequential computing architectures, parallel computing architectures, or some combination thereof.

As described above, the server computing system 630 can store or otherwise include one or more machine-learned projection neural networks 640. For example, the projection neural networks 640 can be or can otherwise include various machine-learned models. Example machine-learned models include neural networks or other multi-layer non-linear models. Example neural networks include feed forward neural networks, deep neural networks, recurrent neural networks, and convolutional neural networks. Example projection neural networks 640 are discussed with reference to FIGS. 1-4.

The user computing device 602 and/or the server computing system 630 can train the projection neural networks 620 and/or 640 via interaction with the training computing system 650 that is communicatively coupled over the network 680. The training computing system 650 can be separate from the server computing system 630 or can be a portion of the server computing system 630.

The training computing system 650 includes one or more processors 652 and a memory 654. The one or more processors 652 can be any suitable processing device (e.g., a processor core, a microprocessor, an ASIC, a FPGA, a controller, a microcontroller, etc.) and can be one processor or a plurality of processors that are operatively connected. The memory 654 can include one or more non-transitory computer-readable storage mediums, such as RAM, ROM, EEPROM, EPROM, flash memory devices, magnetic disks, etc., and combinations thereof. The memory 654 can store data 656 and instructions 658 which are executed by the processor 652 to cause the training computing system 650 to perform operations. In some implementations, the training computing system 650 includes or is otherwise implemented by one or more server computing devices.

The training computing system 650 can include a model trainer 660 that trains the machine-learned projection neural networks 620 and/or 640 stored at the user computing device 602 and/or the server computing system 630 using various training or learning techniques, such as, for example, backwards propagation of errors. In some implementations, performing backwards propagation of errors can include performing truncated backpropagation through time. The model trainer 660 can perform a number of generalization techniques (e.g., weight decays, dropouts, etc.) to improve the generalization capability of the models being trained.

In particular, the model trainer 660 can train the projection neural networks 620 and/or 640 based on a set of training data 662. The training data 662 can include, for example, textual input that has been labeled with target outputs or otherwise has target outputs associated therewith. In some implementations, the target outputs can be text classifications and/or segment classifications.

In some implementations, if the user has provided consent, the training examples can be provided by the user computing device 602. Thus, in such implementations, the projection neural network 620 provided to the user computing device 602 can be trained by the training computing system 650 on user-specific data received from the user computing device 602. In some instances, this process can be referred to as personalizing the model.

The model trainer 660 includes computer logic utilized to provide desired functionality. The model trainer 660 can be implemented in hardware, firmware, and/or software controlling a general purpose processor. For example, in some implementations, the model trainer 660 includes program files stored on a storage device, loaded into a memory and executed by one or more processors. In other implementations, the model trainer 660 includes one or more sets of computer-executable instructions that are stored in a tangible computer-readable storage medium such as RAM hard disk or optical or magnetic media.

The network 680 can be any type of communications network, such as a local area network (e.g., intranet), wide area network (e.g., Internet), or some combination thereof and can include any number of wired or wireless links. In general, communication over the network 680 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 6A illustrates one example computing system that can be used to implement the present disclosure. Other computing systems can be used as well. For example, in some implementations, the user computing device 602 can include the model trainer 660 and the training dataset 662. In such implementations, the projection neural networks 620 can be both trained and used locally at the user computing device 602. In some of such implementations, the user computing device 602 can implement the model trainer 660 to personalize the projection neural networks 620 based on user-specific data.

Figure 6B:
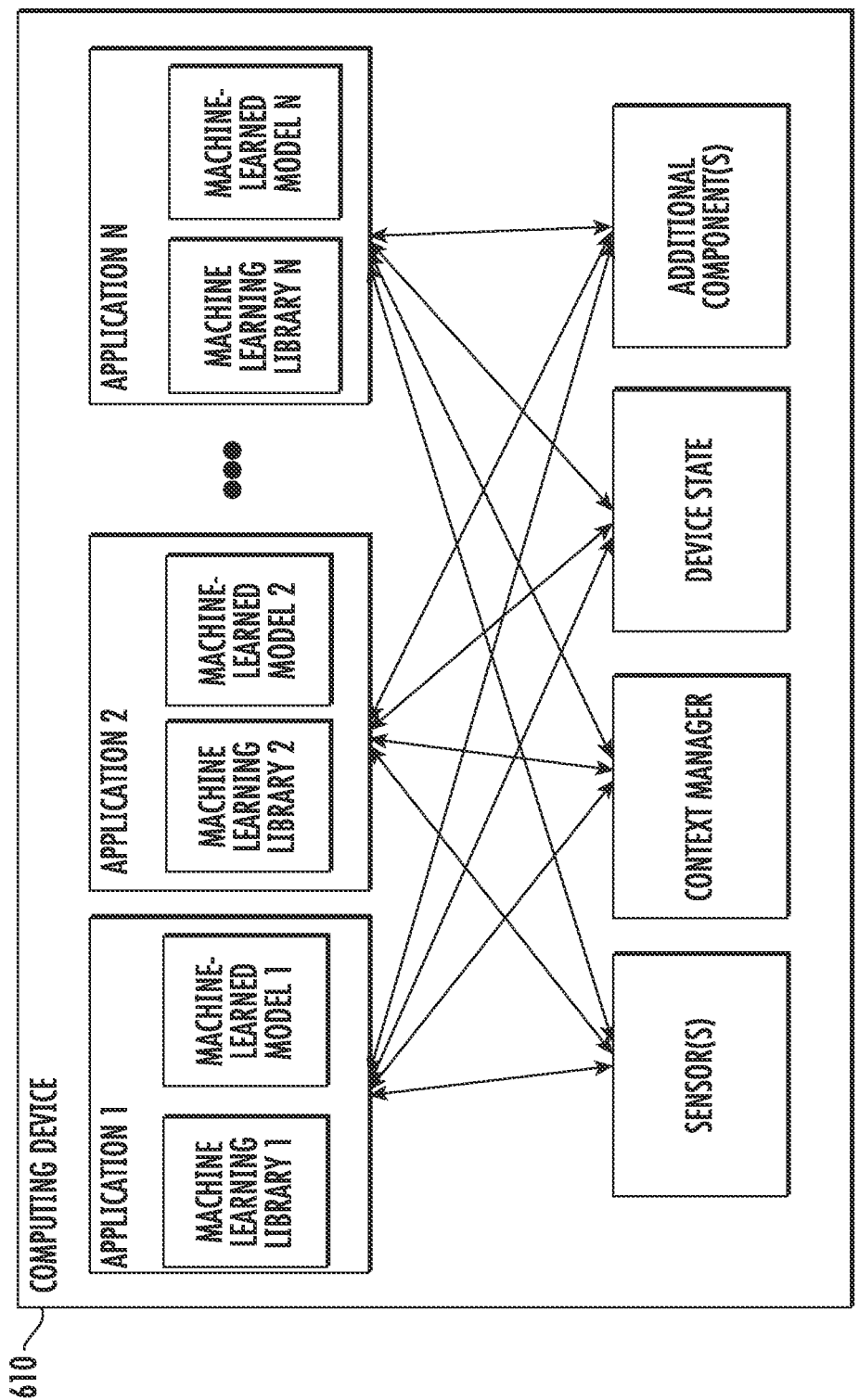

FIG. 6B depicts a block diagram of an example computing device 60 according to example embodiments of the present disclosure. The computing device 60 can be a user computing device or a server computing device.

The computing device 60 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 6B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 6C:
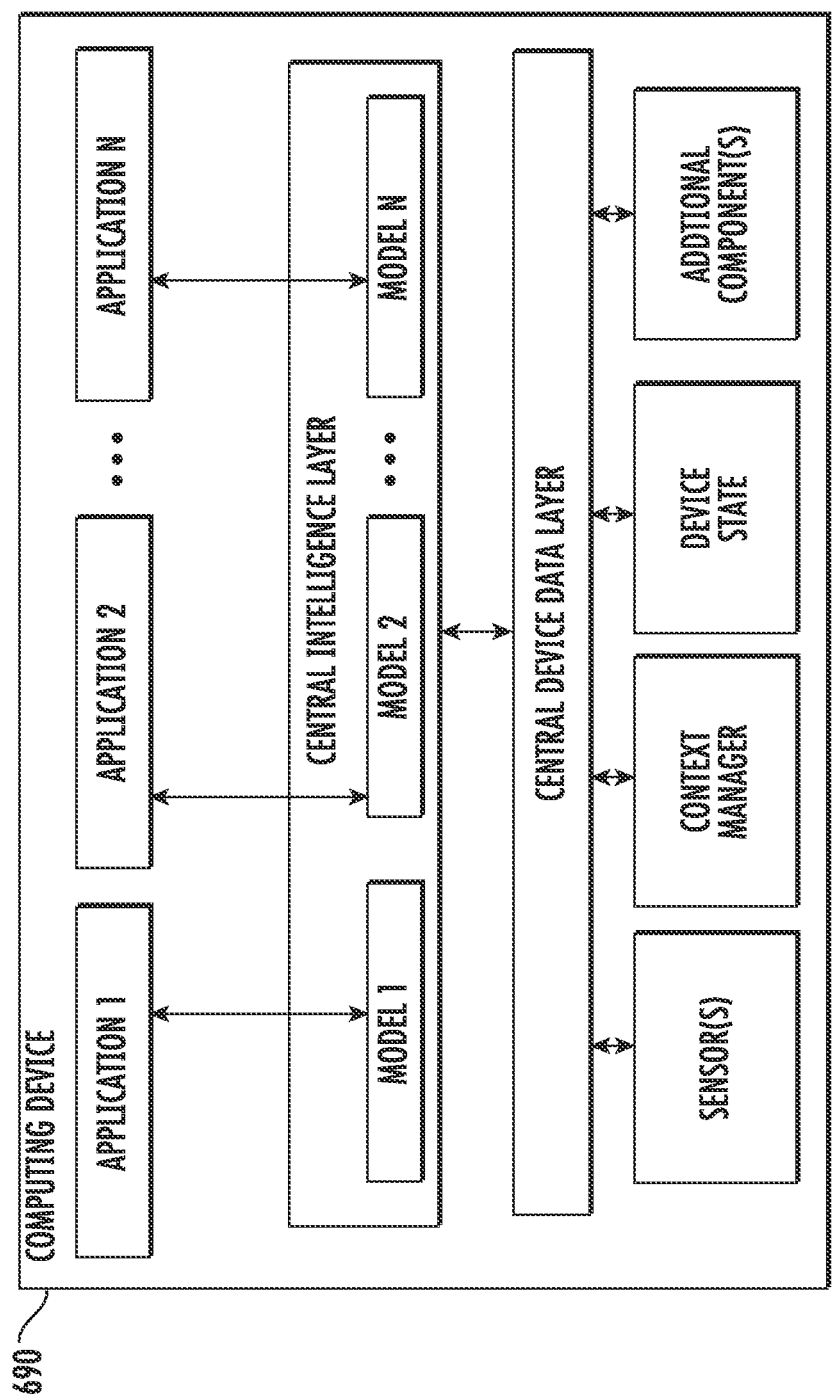
Figure 7:
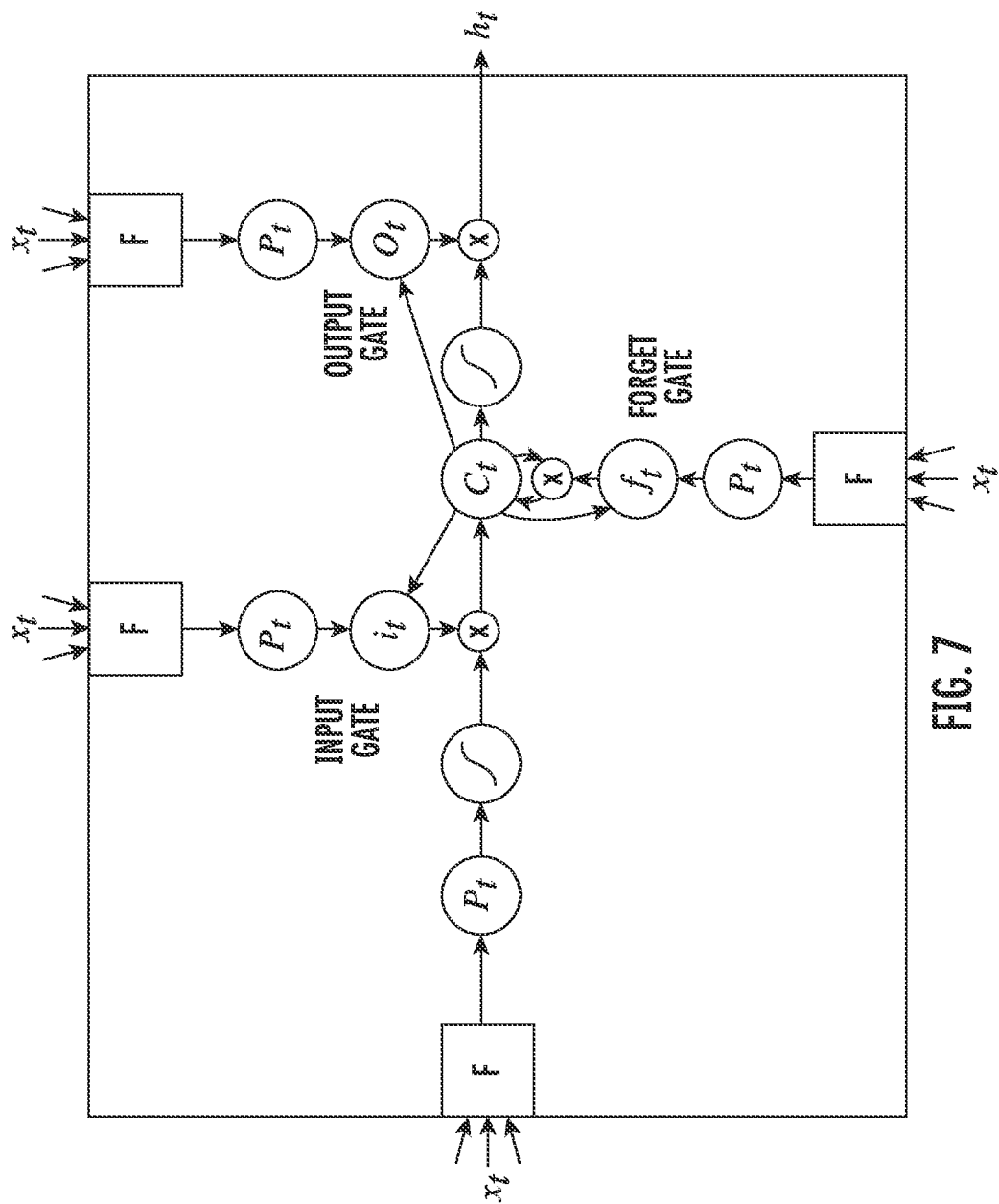
FIG. 7 depicts an example recurrent cell according to example embodiments of the present disclosure.

FIG. 6C depicts a block diagram of an example computing device 690 according to example embodiments of the present disclosure. The computing device 690 can be a user computing device or a server computing device.

The computing device 690 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 6C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 690.

The central intelligence layer can communicate with a central device data layer. The central device data layer can be a centralized repository of data for the computing device 690. As illustrated in FIG. 6C, the central device data layer can communicate with a number of other components of the computing device, such as, for example, one or more sensors, a context manager, a device state component, and/or additional components. In some implementations, the central device data layer can communicate with each device component using an API (e.g., a private API).

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively, or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

In particular, although certain methods described herein respectively depict or recite steps performed in a particular order for purposes of illustration and discussion, the methods of the present disclosure are not limited to the particularly illustrated order or arrangement. The various steps of the methods described herein can be omitted, rearranged, combined, and/or adapted in various ways without deviating from the scope of the present disclosure.

This specification describes a projection neural network implemented as computer programs on one or more computers in one or more locations.

According to another aspect there is provided a system including one or more computers and one or more storage devices storing instructions that when executed by the one or more computers cause the one or more computers to implement a projection neural network. The projection neural network is configured to receive a projection network input and to generate a projection network output from the projection network input. The projection neural network includes a sequence of one or more projection layers, wherein each projection layer has multiple projection layer parameters. Each projection layer is configured to receive a layer input and apply multiple projection layer functions to the layer input. Each projection layer function generates a respective projection function output that projects the layer input to a different space. Each projection layer generates a layer output by applying the projection layer parameters for the projection layer to the projection function outputs.

In some implementations, the projection neural network further includes an output layer configured to receive a layer output generated by a highest projection layer in the sequence and to generate the projection network output.

In some implementations, the output layer is a softmax output layer.

In some implementations, the projection neural network includes only the sequence of projection layers and the output layer.

In some implementations, a layer output of the highest projection layer in the sequence is the projection network output.

In some implementations, the projection neural network includes only the sequence of projection layers.

In some implementations, the layer input of a lowest projection layer in the sequence is a network input to the projection neural network.

In some implementations, the layer input of any projection layer other than the lowest projection layer is a layer output generated by the projection layer immediately below the projection layer in the sequence.

In some implementations, for each projection layer, each projection function is associated with a respective set of projection vectors. Applying each projection function to the layer input includes, for each projection vector: (i) determining a dot product between the layer input and the projection vector, (ii) when the dot product is negative, assigning a first value to a corresponding position in the projection function output, and (iii) when the dot product is positive, assigning a second value to the corresponding position in the projection function output.

In some implementations, for each projection layer, the projection functions are each encoded as sparse matrices and are used to generate a binary representation from the layer input.

In some implementations, the projection layer parameters include a parameter matrix and a bias vector. Generating the layer output by applying the projection layer parameters for the projection layer to the projection function outputs includes applying the parameter matrix to the projection function outputs and then adding the bias vector to the result.

According to another aspect there is provided a method of training the projection neural network. The method includes receiving a training input and a target output for the training input. The training input is processed using the projection neural network in accordance with current values of the projection layer parameters to generate a projection network output for the training input. The training input is processed using a trainer neural network having multiple trainer neural network parameters. The trainer neural network is configured to process the training input in accordance with current values of the trainer neural network parameters to generate a trainer network output that is specific to the particular machine learning task. A gradient is determined with respect to the trainer neural network parameters of a loss function that depends on an error between the target output and the trainer network output. A gradient is determined with respect to the projection layer parameters of a loss function that depends on an error between the trainer network output and the projection network output. Updates to the current values of the trainer network parameters and the projection layer parameters are determined using the gradients.

In some implementations, the output generated by the trainer neural network is a soft target output.

In some implementations, the method further includes determining a gradient with respect to the trainer network parameters of the loss function that depends on the error between the trainer network output and the projection network output. The update to the current values of the trainer network parameters is also based on the gradient with respect to the trainer network parameters of the loss function that depends on the error between the trainer network output and the projection network output.

In some implementations, the method further includes determining a gradient with respect to the projection layer parameters of a loss function that depends on an error between the target output and the projection network output. The update to the current values of the projection layer parameters is also based on the gradient with respect to the projection layer parameters of the loss function that depends on the error between the target output and the projection network output.

According to another aspect there is provided a system including one or more computers and one or more storage devices storing instructions that when executed by the one or more computers cause the one or more computers to perform the operations of the previously described method.

According to another aspect there is provided one or more computer storage media storing instructions that when executed by one or more computers cause the one or more computers to perform the operations of the previously described method.

According to another aspect there is provided one or more computer storage media storing instructions that when executed by one or more computers cause the one or more computers to implement the previously described projection neural network.

What is claimed is:

1. A system comprising one or more computers and one or more storage devices storing instructions that when executed by the one or more computers cause the one or more computers to implement:
   a machine-learned multi-layered projection model configured to receive a projection model input and to generate a projection model output from the projection model input, the machine-learned multi-layered projection model comprising:
      a sequence of one or more projection layers, wherein each projection layer has a plurality of projection layer parameters, wherein each projection layer is configured to:
         receive a layer input;
         apply a plurality of projection layer functions to the layer input, each projection layer function generating a respective projection function output that projects the layer input to a different space, and
         generate a layer output by applying the projection layer parameters for the projection layer to the projection function outputs; and
      a sequence of one or more additional model layers configured to receive a layer output generated by a highest projection layer in the sequence of one or more projection layers and to generate one or more additional model layer outputs;
   wherein execution of the instructions causes the one or more computers to perform operations comprising:
      obtaining the projection model input;
      inputting the projection model input into the machine-learned multi-layered projection model; and
      receiving the projection model output generated by the machine-learned multi-layered projection model.

2. The system of claim 1, wherein the machine-learned multi-layered projection model further comprises:
   an output layer configured to receive the additional model layer output generated by a highest additional model layer in the sequence of one or more additional model layers and to generate the projection model output.

3. The system of claim 1, wherein the sequence of one or more projection layers comprises a plurality of projection layers one after the other.

4. The system of claim 1, wherein the sequence of one or more additional model layers comprises one or more neural model layers.

5. The system of claim 1, wherein the sequence of one or more additional model layers comprises one or more additional projection layers.

6. The system of claim 1, wherein the sequence of one or more additional model layers comprises one or more projection sequence layers.

7. The system of claim 1, wherein the machine-learned multi-layered projection model is trained to perform on-device text classification.

8. The system of claim 7, wherein execution of the instructions by the one or more computers causes the one or more computers to:
   receive an input text;
   convert the input text into an intermediate feature vector; and
   input the intermediate feature vector as the projection model input to the machine-learned multi-layered projection model.

9. The system of claim 8, wherein the intermediate feature vector comprises one or more of the following intermediate features that have been generated from or associated with the input text:
- skip-grams;
- n-grams;
- part of speech tags;
- dependency relationships;
- knowledge graph information; or
- contextual information.

10. The system of claim 1, wherein, for each projection layer, the plurality of projection layer functions are precomputed and held static.

11. The system of claim 1, wherein, for each projection layer, the plurality of projection layer functions are modeled using locality sensitive hashing.

12. The system of claim 1, wherein execution of the instructions by the one or more computers causes the one or more computers to:
- dynamically compute the plurality of projection layer functions at inference time using one or more seeds.

13. The system of claim 1, wherein the machine-learned multi-layered projection model comprises a self-governing neural model that performs natural language processing without initializing, loading, or storing any feature or vocabulary weight matrices.

14. The system of claim 1, wherein the machine-learned multi-layered projection model has been trained based solely on its own performance relative to training data.

15. The system of claim 1, wherein, for each projection layer, each projection function is associated with a respective set of projection vectors, and wherein applying each projection function to the layer input comprises:
- for each projection vector:
  - determining a dot product between the layer input and the projection vector;
  - when the dot product is negative, assigning a first value to a corresponding position in the projection function output; and
  - when the dot product is positive, assigning a second value to the corresponding position in the projection function output.

16. The system of claim 1, wherein, for each projection layer, the projection functions are each encoded as sparse matrices and are used to generate a binary representation from the layer input.

17. The system of claim 1, wherein the projection layer parameters include a parameter matrix and a bias vector, and wherein generating the layer output by applying the projection layer parameters for the projection layer to the projection function outputs comprises:
- applying the parameter matrix to the projection function outputs and then adding the bias vector.

18. A system comprising one or more computers and one or more storage devices storing instructions that when executed by the one or more computers cause the one or more computers to implement:
- a projection sequence model configured to receive an input and to generate an output from the input, the projection sequence model comprising:
  - a sequence of one or more projection layers, wherein each projection layer has a plurality of projection layer parameters, wherein each projection layer is configured to:
    - receive a layer input;
    - apply a plurality of projection layer functions to the layer input, each projection layer function generating a respective projection function output that projects the layer input to a different space, and
    - generate a layer output by applying the projection layer parameters for the projection layer to the projection function outputs; and
  - one or more projection sequence layers positioned after the sequence of one or more projection layers, wherein each of the one or more projection sequence layers is configured to provide first internal state data to a subsequent iteration of such projection sequence layer in a subsequent iteration of the projection sequence model and to receive second internal state data from the subsequent iteration of such projection sequence layer in the subsequent iteration of the projection sequence model;
- wherein execution of the instructions causes the one or more computers to perform operations comprising:
  - obtaining the input;
  - inputting the input into the projection sequence model; and
  - receiving the output generated by the projection sequence model.

19. The system of claim 18, wherein the input comprises text and the output comprises segments of the text that have been identified and classified into respective ones of a plurality of classes by the projection sequence model.

20. The system of claim 18, wherein each projection sequence layer comprises:
- a first set of nodes configured to provide the first internal state data of the first set of nodes to a subsequent iteration of the first set of nodes in the subsequent iteration of such projection sequence layer in the subsequent iteration of the projection sequence model; and
- a second set of nodes that are distinct from the first set of nodes, the second set of nodes configured to receive the second internal state data from a subsequent iteration of the second set of nodes in the subsequent iteration of such projection sequence layer in the subsequent iteration of the projection sequence model.

* * * * *